(12) United States Patent
Entchev et al.

(10) Patent No.: US 8,657,005 B2
(45) Date of Patent: Feb. 25, 2014

(54) SYSTEMS AND METHODS FOR HYDRAULIC BARRIER FORMATION TO IMPROVE SWEEP EFFICIENCY IN SUBTERRANEAN OIL RESERVOIRS

(75) Inventors: Pavlin B. Entchev, Houston, TX (US); Donald E. Owens, III, Austin, TX (US); Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 346 days.

(21) Appl. No.: 13/017,832

(22) Filed: Jan. 31, 2011

(65) Prior Publication Data

US 2011/0265994 A1 Nov. 3, 2011

Related U.S. Application Data

(60) Provisional application No. 61/330,037, filed on Apr. 30, 2010.

(51) Int. Cl.
*E21B 33/13* (2006.01)

(52) U.S. Cl.
USPC .......... 166/292; 166/305.1; 166/294; 166/285

(58) Field of Classification Search
None
See application file for complete search history.

(56) References Cited

U.S. PATENT DOCUMENTS

| | | | |
|---|---|---|---|
| 3,297,088 A | 1/1967 | Huitt et al. | |
| 3,323,589 A | 6/1967 | Harvey et al. | |
| 3,369,605 A | 2/1968 | Donaldson et al. | |
| 3,530,937 A | 9/1970 | Bernard | |
| 3,601,194 A * | 8/1971 | Gallus | 166/283 |
| 4,098,337 A | 7/1978 | Argabright et al. | |
| 4,182,417 A | 1/1980 | McDonald et al. | |
| 4,332,297 A | 6/1982 | Sandiford | |
| 4,361,186 A * | 11/1982 | Kalina | 166/295 |
| 4,637,467 A | 1/1987 | Shaw et al. | |
| 4,643,255 A | 2/1987 | Sandiford et al. | |
| 5,067,564 A | 11/1991 | Sydansk | |
| 5,259,453 A | 11/1993 | Johnston | |
| 5,368,101 A * | 11/1994 | Chauveteau et al. | 166/400 |
| 5,476,145 A | 12/1995 | Sengul et al. | |
| 6,228,812 B1 | 5/2001 | Dawson et al. | |
| 6,302,209 B1 * | 10/2001 | Thompson et al. | 166/305.1 |
| 6,720,292 B1 | 4/2004 | Zhou et al. | |
| 6,889,766 B2 | 5/2005 | Creel et al. | |
| 7,021,376 B2 | 4/2006 | Bayliss et al. | |
| 2007/0062697 A1 * | 3/2007 | Barbosa et al. | 166/263 |
| 2009/0260820 A1 | 10/2009 | Kurian et al. | |

OTHER PUBLICATIONS

Walstra, P. (1993) "Principles of Emulsion Formation" *Chemical Engineering Science* vol. 48, No. 2 p. 333-349.

* cited by examiner

*Primary Examiner* — Shane Bomar
*Assistant Examiner* — Silvana Runyan
(74) *Attorney, Agent, or Firm* — ExxonMobil Upstream Research Company—Law Department

(57) ABSTRACT

Systems and methods for creating a hydraulic barrier at an interface between high and low permeability regions that may exist in high permeability-contrast subterranean formations. These systems and methods may include providing injection and/or production wells that are completed within the high and/or low permeability regions, supplying a pore throat blocking agent to an interface between the high and low permeability regions, and forming the hydraulic barrier at the interface. The pore throat blocking agent may be sized to substantially flow through the high permeability region while being substantially blocked, or occluded, from the low permeability region. In some embodiments, the hydraulic barrier may be greater than one acre (0.4 hectare) in area. In some embodiments, the subterranean formation may include an oil reservoir. In some embodiments, the high and/or low permeability formations may be swept concurrently and/or independently to remove oil from the oil reservoir.

31 Claims, 6 Drawing Sheets ively small, a significant percentage of the potentially recoverable oil may still remain within the low permeability region. Thus, there exists a need for alternative methods to improve the recovery of oil from high permeability-contrast subterranean reservoirs.

SYSTEMS AND METHODS FOR HYDRAULIC BARRIER FORMATION TO IMPROVE SWEEP EFFICIENCY IN SUBTERRANEAN OIL RESERVOIRS

CROSS-REFERENCE TO RELATED APPLICATION

The present application claims priority to and the benefit of U.S. Provisional Patent Application Ser. No. 61/330,037, which was filed on 30 Apr. 2010, which was entitled, SYSTEMS AND METHODS FOR HYDRAULIC BARRIER FORMATION TO IMPROVE SWEEP EFFICIENCY IN SUBTERRANEAN OIL RESERVOIRS, and which is incorporated herein by reference in its entirety for all purposes.

FIELD OF THE DISCLOSURE

The present disclosure is related generally to systems and methods for improving oil recovery from permeability-contrast subterranean oil reservoirs, and more particularly to such systems and methods that involve the creation of a hydraulic barrier at an interface between subterranean regions of different permeability.

BACKGROUND OF THE DISCLOSURE

Significant volumes of oil are known to exist in permeability-contrast subterranean reservoirs that include one or more high permeability regions adjacent to and/or in fluid communication with one or more low permeability, but porous, regions. A significant percentage of the oil in place in such reservoirs may be contained within the low permeability regions. Primary and secondary oil recovery techniques may be effective at removing the recoverable oil from the high permeability regions of the reservoir; however, it may be difficult to remove the oil contained within the low permeability regions of the reservoir without improvements to standard oil recovery techniques.

Examples of secondary oil recovery techniques that may be utilized to enhance the recovery of oil from subterranean reservoirs include fluid injection techniques such as waterflooding and steam flooding, which respectively include the injection of liquid water and steam into the reservoir to mobilize and sweep fluids from the reservoir and the production of the mobilized and swept reservoir fluids from the subsurface formation containing the subterranean reservoir. However, since pressurized fluids tend to flow along the path of least resistance, the presence of a high permeability region in fluid communication with a low permeability region, as is the case within high permeability-contrast subterranean reservoirs, may result in channeling of the injected and/or the produced fluids through the high permeability region. While this may enable efficient sweep of the high permeability region of the subterranean reservoir, a significant percentage of the oil present within the low permeability region may remain despite the employment of these secondary production techniques.

One method of increasing oil recovery in high permeability-contrast subterranean reservoirs may be through tight well spacing, such as through drilling additional injection and/or production wells within the subterranean reservoir, and especially in the low permeability region thereof. This approach may increase the percentage of oil that may be removed from the subterranean reservoir over a reasonable time frame. However, the increased costs associated with drilling additional wells may be prohibitive. In addition, unless the distance between the wells is relat Traditional waterflooding techniques have been modified in a variety of ways to improve oil recovery from high permeability-contrast subterranean reservoirs. One such modification is to decrease the permeability of the high permeability region and thus reduce the driving force for channeling by artificially creating a more uniform overall permeability within the subterranean reservoir. This may be accomplished by providing a blocking agent that is adapted to partially and/or completely occlude the pore structure of the high permeability region of the subterranean reservoir. This occlusion may be accomplished by supplying an intact blocking agent to the high permeability region and/or by forming the blocking agent in situ, generally in the vicinity of a well. Illustrative, non-exclusive examples of intact blocking agents that may be supplied to the subterranean reservoir are disclosed in U.S. Pat. Nos. 3,323,589, 4,182,417, and 6,228,812, the complete disclosures of which are hereby incorporated by reference. Illustrative, non-exclusive examples of blocking agents that may be formed in situ are disclosed in U.S. Pat. Nos. 3,530,937, 4,098,337, 4,361,186, 4,637,467, 4,643,255, and 7,021,376, the complete disclosures of which are hereby incorporated by reference. While these approaches may be effective under certain conditions, changing the bulk permeability of the high permeability region may require that a large mass of blocking agent be supplied to the subterranean reservoir. Moreover, optimally placing the blocking agents may be difficult if the high permeability region covers a large area or is not immediately adjacent to a well.

An alternative approach may be the formation of a hydraulic barrier. While the use of near-wellbore hydraulic barriers to decrease water and/or gas coning is disclosed in U.S. Pat. Nos. 3,297,088, 3,369,605, 5,067,564, 5,259,453, and 5,476,145, the complete disclosures of which are hereby incorporated by reference, these barriers are constrained to within a few meters of the wellbore, may rely on manmade horizontal fractures for their formation, and are not formed at an interface between high and low permeability regions of the subterranean reservoir.

SUMMARY OF THE DISCLOSURE

The present disclosure is directed to systems and methods for creating a hydraulic barrier between high and low permeability regions that may exist in a high permeability-contrast subsurface region, such as in a subterranean formation thereof. The systems and methods may include providing injection and/or production wells that may be completed within the high and/or low permeability regions. The subterranean formation may include an oil reservoir and the systems and methods may include producing oil from the oil reservoir. The hydraulic barriers may be created by supplying a solution or other mixture of injected fluid and a pore throat blocking agent to an interface between the high and low permeability regions and occluding fluid flow pores to increase resistance to liquid flow through the interface. The pore throat blocking agent may be sized to substantially flow through the high permeability region while being substantially blocked, or occluded, from the low permeability region. Formation of the barrier may improve reservoir sweep efficiency by systematically modifying the fluid flow path through the reservoir and/or by limiting bypass and/or channeling effects. The barrier also may isolate the high permeability regions from the low permeability regions and may enable them to be treated as separate formations and/or separate reservoirs, which may be swept independently. The barrier may be macroscopic and may cover one or more acres (0.40 hectare) in area. In some systems and/or methods according to the present disclosure, additional production and/or injection wells may be completed within the low permeability region after creation of the macroscopic barrier.

DETAILED DESCRIPTION AND BEST MODE OF THE DISCLOSURE

Figure 1:
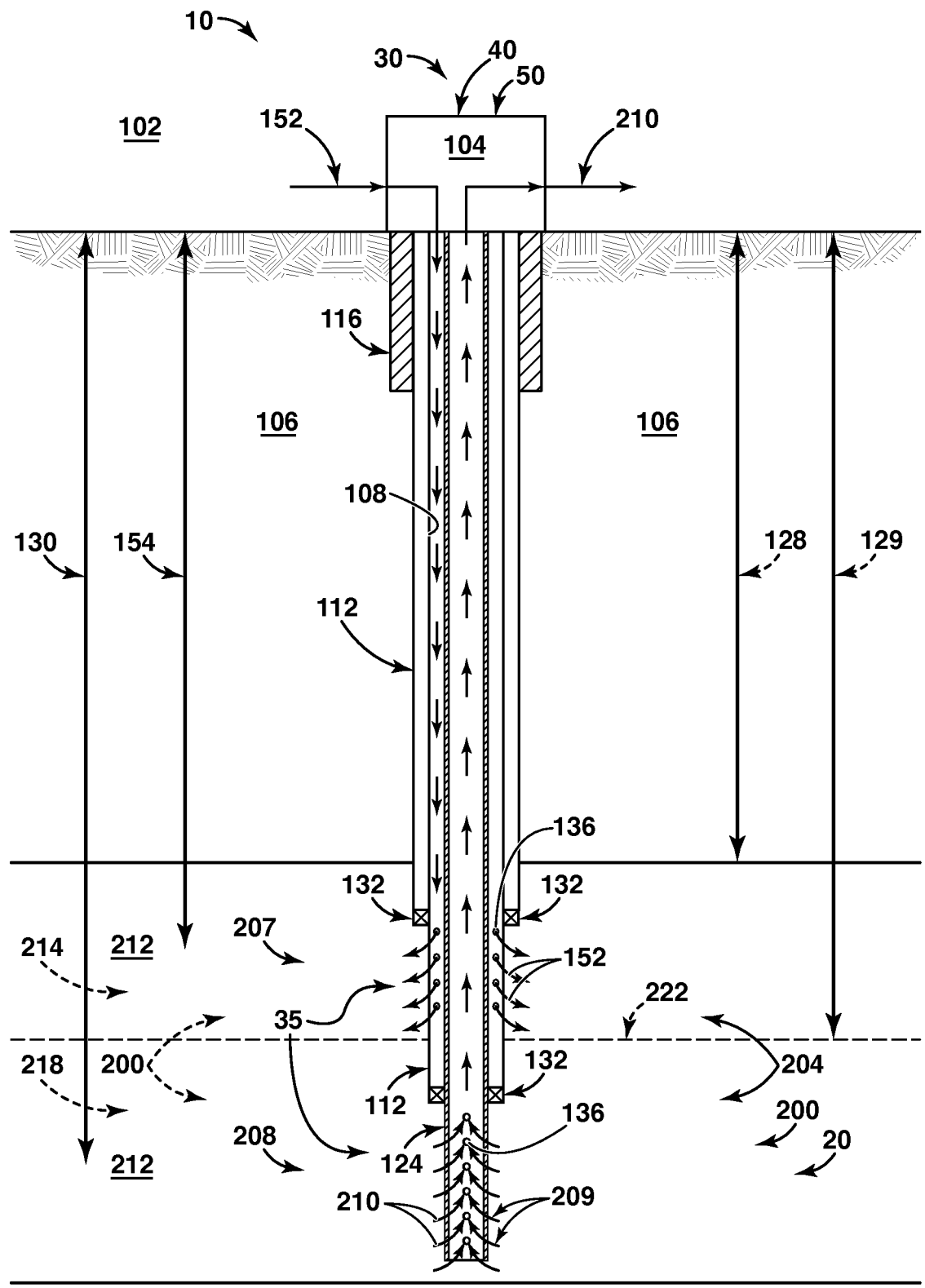
FIG. 1 is an illustrative, non-exclusive schematic example of a vertical oil well that may be utilized according to the present disclosure.

The present disclosure is directed to systems and methods for creating a hydraulic barrier between high and low permeability regions that may exist in high permeability-contrast subterranean reservoirs of subsurface formations. As discussed in more detail herein, these systems and methods may include providing injection and/or production wells that are completed within the high and/or low permeability regions of the subterranean reservoir; supplying a pore throat blocking agent to an interface between the high and low permeability regions; and forming the hydraulic barrier at the interface between high and low permeability regions. As further discussed herein, the pore throat blocking agent may be sized to substantially flow through the high permeability region while being substantially blocked, or occluded, from the low permeability region.

In some embodiments, the subsurface formation may include a subterranean oil reservoir, and the systems and methods may include improving the sweep efficiency of the subterranean oil reservoir. In some embodiments, the pore throat blocking agent may be supplied to the high permeability region and flow from the high permeability region to the interface between the high and low permeability regions. In some embodiments, the hydraulic barrier may be at least one acre (0.40 hectare) in size. In some embodiments, the high and low permeability regions may be swept independently after the hydraulic barrier is formed.

As used herein, "subterranean formation" and/or "subsurface formation" means a subsurface region, regardless of size, comprising an aggregation of subsurface sedimentary, metamorphic, and/or igneous matter, whether consolidated or unconsolidated, and other subsurface matter, whether in a solid, semi-solid, liquid, and/or gaseous state, related to the geological development of the subsurface region. A formation may contain numerous geologic strata of different ages, textures, and mineralogic compositions. A formation can refer to a single set of related geologic strata of specific rock type, or to a whole set of geologic strata of different rock types that contribute to or are encountered in, for example, without limitation, (i) the creation, generation, and/or entrapment of hydrocarbons or minerals and (ii) the execution of processes used to extract hydrocarbons or minerals from the subsurface region. A subterranean formation may include a subterranean, or subsurface, reservoir that includes oil or other gaseous or liquid hydrocarbons, water, or other fluids.

As used herein, "hydrocarbon" or "hydrocarbons" may refer to any number of carbon and hydrogen-containing compounds and/or mixtures of compounds that may be contained within subterranean formations, such as in the subterranean reservoir thereof. Illustrative, non-exclusive examples of hydrocarbons according to the present disclosure may include petroleum, oil, crude oil, natural gas, tar, bitumen, and/or mixtures of these materials, as well as any other naturally occurring organic compound that may be found within subterranean geologic formations. The terms oil, crude oil, petroleum, and liquid hydrocarbon may be used interchangeably herein.

As used herein, the term "permeability" may refer to a measure of the ability of a porous material, such as rock, to transmit fluids. The units of permeability are area$^2$, such as m$^2$, cm$^2$, and/or millidarcies (mD, or $10^{-9}$ m$^2$). The permeability of a porous material may be quantified by its permeability constant, which may be defined by:

$$\kappa = \frac{v\mu\Delta x}{\Delta p}$$

where v is the bulk fluid flow velocity (m/s), µ is the dynamic viscosity (Pa·s), ∆P is the pressure drop (Pa) across the distance ∆x (m), and κ is the permeability constant of the medium (m$^2$). The terms permeability and permeability constant may be used interchangeably herein.

As used herein, "high permeability" is a relative term that may refer to a permeability that is greater than another permeability, termed "low permeability." As an illustrative, non-exclusive example, a high permeability region of a subterranean reservoir may have a greater permeability (and thus a lower resistance to fluid flow) than a low permeability region of the subterranean reservoir. Since, as used herein, both high permeability and low permeability are relative terms, they may take on overlapping ranges. Illustrative, non-exclusive examples of high permeabilities according to the present disclosure include permeabilities of greater than 1 mD, such as permeabilities of, or greater than, any of 10, 25, 50, 100, 250, 500, 1,000, or 10,000 mD. Illustrative, non-exclusive examples of low permeabilities according to the present disclosure include permeabilities of less than 10,000 mD, such as permeabilities of, or less than, any of 5,000, 1,000, 500, 250, 100, 50, 25, 10, or 1 mD. Both high and low permeabilities outside the above ranges are also within the scope of the present disclosure.

As used herein, "permeability ratio" and/or "permeability contrast" may refer to the ratio of the permeability of the high permeability region to the permeability of the low permeability region. In addition, high permeability ratio and/or high permeability contrast may refer to a permeability ratio that may be significantly greater than one. Illustrative, non-exclusive examples of high permeability contrast according to the present disclosure includes permeability contrasts greater than 1, such as permeability contrasts of, or at least, any of 5, 7, 10, 25, 50, 100, 200, 500, 1,000, or 5,000.

As used herein, "fluid injection" may refer to the injection of stimulant fluids into a subterranean reservoir to increase the pressure within the reservoir, increase the temperature within the reservoir, decrease the viscosity of liquid hydrocarbon deposits contained within the reservoir, and/or increase the production of oil in any suitable manner and/or via any suitable mechanism. Illustrative, non-exclusive examples of fluid injection include any of the secondary oil recovery techniques disclosed herein, such as waterflooding, in which water is supplied to a subterranean reservoir via an injection well. This water may increase the pressure within the reservoir and may sweep oil contained within the reservoir from the injection well to a production well, where it may be removed (i.e., produced) from the reservoir.

As used herein, "sweep" may refer to the displacement of oil within a reservoir by a flooding fluid, such as water. In addition, "oil in place" may refer to the total hydrocarbon content of a subterranean reservoir prior to production from the reservoir, while "oil reserves" or "recoverable oil" may refer to the oil that may be technically and/or economically recovered from the reservoir. Sweep efficiency may be defined as the ratio of the oil removed from a reservoir to the oil in place. Thus, in a depleted reservoir, the sweep efficiency may be equal to the ratio of the recoverable oil to the oil in place.

As used herein, "primary oil recovery techniques" may refer to oil recovery techniques that enable oil to flow from the subterranean reservoir to the surface under the influence of the natural pressure present within the reservoir. This natural pressure may be the result of water displacing the oil toward the surface, the expansion of natural gas that is present in the reservoir, the evolution of gas dissolved within the oil itself, and/or gravity drainage of oil from the upper parts of the reservoir to the lower parts of the reservoir. In contrast, "secondary oil recovery techniques" may refer to techniques that artificially increase the pressure within the reservoir to provide a driving force for oil production. These may include the fluid injection techniques described herein.

An illustrative, non-exclusive example of a hydrocarbon production system 10 is shown schematically in FIG. 1. Hydrocarbon production system 10 is being presented to give context to the systems and/or methods according to the present disclosure for improving oil recovery from layered and/or otherwise permeability-contrast subterranean oil reservoirs and/or for creating hydraulic barriers in such permeability-contrast reservoirs. Accordingly, while the systems and/or methods may be implemented and/or utilized in such a hydrocarbon production system, other such hydrocarbon production systems and/or system configurations may be utilized without departing from the scope of the present disclosure.

In the illustrative, non-exclusive example shown in FIG. 1, hydrocarbon production system 10 includes a hydrocarbon well 30, in the form of an oil well, which may include a production well 40, an injection well 50, or a combination production/injection well, as shown. Well 30 may be created by any suitable method of construction and may include any suitable materials. This may include a plurality of casings 112 contained within a wellbore 108. The casings may aid in drilling the well and/or may serve to reinforce the wellbore. A portion of the external surface of casings 112 may be sealed to, and/or supported within, the surrounding subsurface strata 106 using cement 116 or another suitable material. Within casings 112, the wellbore may further include one or more pipes, tubes, sheaths, and/or linings 124, which may serve as conduits to convey material, such as oil or other hydrocarbons, water, etc., between surface region 102 and a subterranean formation 20, such as a subterranean reservoir 200 thereof. A production tree 104 may serve to connect casing 112 and/or lining 124 to surface region 102, and typically will include suitable valves, fittings, and related structure to regulate and/or control access and/or fluid flow to and/or from the subsurface, or subterranean, portion of the well. Packers 132 may be present and may be utilized to limit the flow of fluid into casings 112. A portion of casing 112 may contain perforations 136. Produced fluids 210, such as hydrocarbons, oil, natural gas, and/or water may enter the casing through the perforations at a production depth, which may be an average production depth, 130, where they may be transported to the surface region. The perforations also may provide a path for injected fluid(s) 152 to flow from the tree and/or surface region into subterranean formation 20 at an injection depth, which may be an average injection depth, 154. Illustrative, non-exclusive examples of injected fluids according to the present disclosure include water, steam, solvents, gases such as carbon dioxide, methane, natural gas, nitrogen, and/or any other suitable fluid for injection into a subterranean formation.

In the illustrative, non-exclusive example of FIG. 1, hydrocarbon well 30 is shown as a dual-completion well that includes both production and injection capabilities, together with separate average injection and production depths. It is within the scope of the present disclosure that well 30 may include a multiple completion well that includes a plurality of average injection depths, which may include any depth suitable for injecting (which additionally or alternatively may be referred to as supplying and/or pumping) injected fluids 152 into the subterranean reservoir, and/or a plurality of average production depths, which may include any depth suitable for the production (which additionally or alternatively may be referred to as recovery and/or extraction) of reservoir fluid(s) 209 from subsurface formation 20, such as from a subterranean reservoir 200 thereof. It is also within the scope of the present disclosure that hydrocarbon well 30 includes only production well 40 or only injection well 50.

Hydrocarbon production system 10 also may include a subsurface formation 20. The subsurface formation may comprise one or more subsurface, or subterranean, reservoirs 200, which may contain oil-bearing strata 204. The portion of oil-bearing strata 204 that is in fluid communication with hydrocarbon well 30 may be referred to as an injection zone 207 and/or as a production zone 208, depending upon whether the portion is having injected fluids injected therein and/or having oil or other reservoir fluids produced therefrom. Subsurface formation 20 and/or subterranean reservoir 200 may include (and/or be described as including) a plurality of sub-regions 212, such as a high permeability region 214 and a low permeability region 218. Sub-regions 212 may additionally or alternatively be referred to herein as regions, zones, strata, sub-formations, and/or layers of the subterranean reservoir and/or the subsurface formation. The high and low permeability regions 214 and 218 may additionally or alternatively be referred to as high and low permeability sub-regions, zones, strata, formations, layers and/or sub-formations. The pressure within subsurface formation 200 may be greater than the pressure in surface region 102. This pressure differential may cause reservoir fluids 209, such as oil, to flow from subsurface formation 200, through well 30, to surface region 102 as produced fluid 210.

When subsurface formation 20, and/or a subterranean reservoir 200 thereof, includes a plurality of sub-regions 212, each may have its own depth, such as high permeability region depth 128 and low permeability region depth 129. In addition, subsurface formation 20, and/or a subterranean reservoir 200 thereof, may further include an interface, or interface region, 222 that forms an interface between regions of differing permeabilities and/or compositions, such as high permeability region 214 and low permeability region 218.

While interface region 222 is schematically depicted as a defined, linear structure in FIG. 1, it is within the scope of the present disclosure that the interface region may have a variety of shapes, dimensions, areas, thicknesses, lengths, and/or configurations. As illustrative, non-exclusive examples, interface region 222 may include a sharp and/or distinctly defined boundary, or border, in which the transition between sub-regions is well-defined and takes place over the course of a relatively short distance, as well as a broader boundary, border, or mixing zone, in which the characteristics of the interface change from those of a first sub-region to those of a second sub-region over a larger distance. It is also within the scope of the present disclosure that the composition of interface region 222 may vary spatially. Interface region 222 is intended to refer to a macroscopic boundary between regions having distinctly contrasting average permeabilities that differ by factors of at least two, five, ten, or more. By "macroscopic," it is meant that interface region 222 will extend over an area of at least a half acre (0.20 hectare), including areas of at least 1 acre (0.40 hectare), 2 acres (0.81 hectare), 5 acres (2.0 hectares), or more.

As stated herein, FIG. 1 is an illustrative, non-exclusive example of hydrocarbon production systems 10 with a subsurface formation 20 that includes a subterranean reservoir 200. Thus, though the subterranean region of FIG. 1 illustrates only two sub-regions 212, it is with the scope of the present disclosure that a plurality of sub-regions 212 may be present within the a subsurface formation, and/or a subterranean reservoir 200 thereof, such as 3, 4, 5, or more than 5 sub-regions 212, and that the permeability of the sub-regions may vary in such a manner to define corresponding interface regions 222 between permeability-contrasted sub-regions. It is also within the scope of the present disclosure that hydrocarbon well 30 includes one or more completions in some and/or all of the sub-regions and that these completions include injection and/or production completions. It is further within the scope of the present disclosure that the relative area, thickness, and/or volume of the sub-regions may vary, including sub-regions that are substantially the same thickness, as well as one or more sub-regions that are substantially thicker and/or thinner than one or more other sub-regions or sub-regions of spatially varying thickness. It is further within the scope of the present disclosure that hydrocarbon production system 10 may include a plurality of hydrocarbon wells 30.

Figure 2:
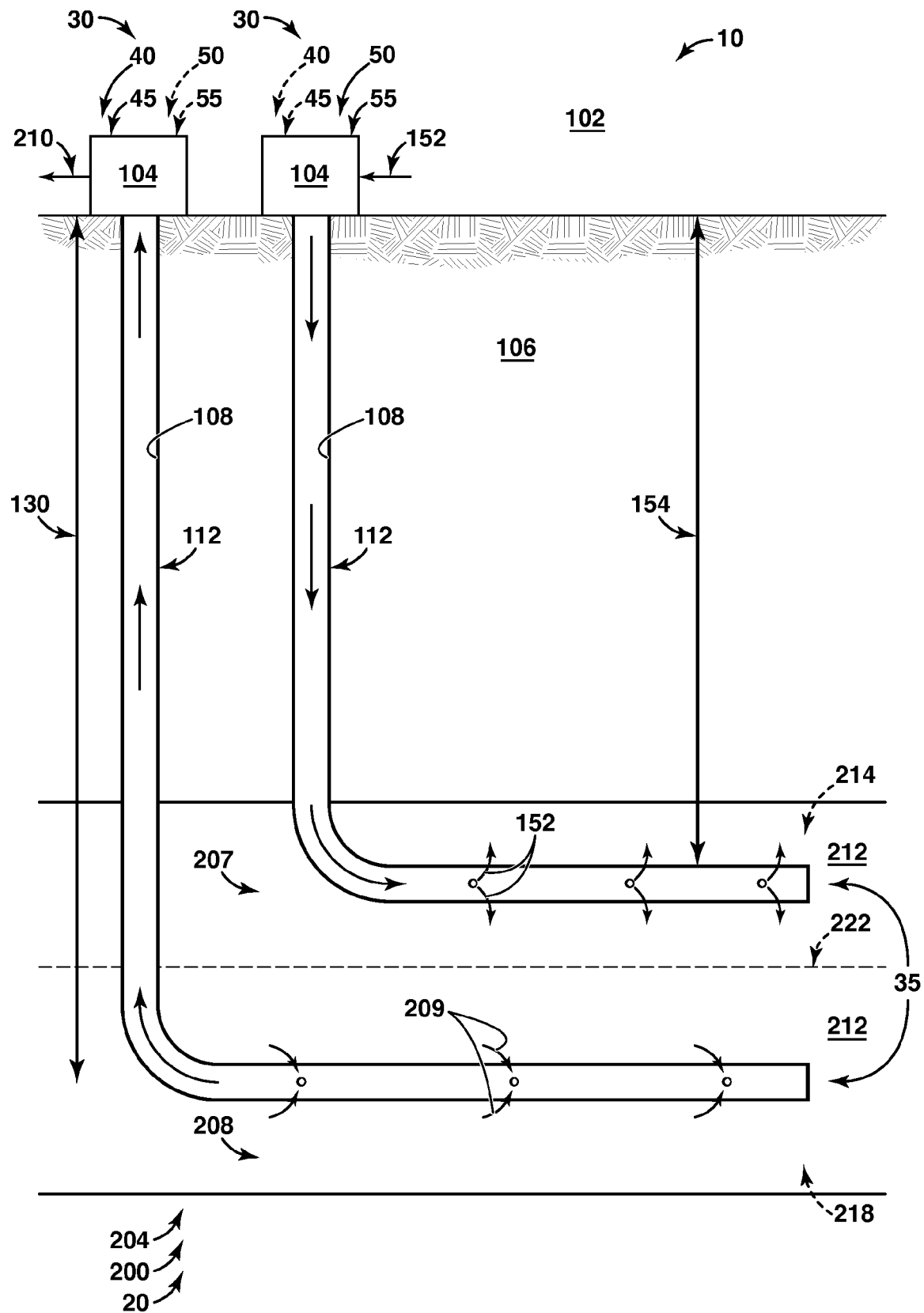
FIG. 2 is an illustrative, non-exclusive schematic example of horizontal oil wells that may be utilized according to the present disclosure.

Another illustrative, non-exclusive example of hydrocarbon production system 10 is schematically illustrated in FIG. 2. Similar to the hydrocarbon production system shown in FIG. 1, the hydrocarbon production system of FIG. 2 is being presented to give context to the systems and/or methods according to the present disclosure for improving oil recovery from layered and/or otherwise permeability-contrast subterranean oil reservoirs and/or for creating hydraulic barriers in such permeability-contrast reservoirs. Accordingly, while the systems and/or methods may be implemented and/or utilized in such a hydrocarbon production system, other such hydrocarbon production systems and/or system configurations may be utilized without departing from the scope of the present disclosure.

The hydrocarbon production system of FIG. 2 is substantially similar to that of FIG. 1, except that it may utilize production and injection wells 40 and 50 in the form of horizontal production well(s) 45 and/or horizontal injection well(s) 55 instead of, and/or in addition to, the vertical well of FIG. 1. The vertical well of FIG. 1 and the horizontal wells of FIG. 2 may additionally or alternatively be described as including, respectively, a well section that extends vertically or horizontally or within a range of being vertical or horizontal, such as within 5 degrees, 10 degrees, 15 degrees, or 20 degrees. The respective vertical and horizontal well sections may be and/or may include a completion, or completion portion, of the well. As such, they additionally or alternatively may be described as vertical and horizontal well completion sections, respectively. In FIGS. 1 and 2, well sections that include a completion, or completion portion, are indicated generally at 35, and as discussed, may be respectively referred to as vertical well completion sections or horizontal well completion sections depending upon the vertical or horizontal orientation of the corresponding section of the well.

In FIG. 2, horizontal injection well 55 may provide injected fluid 152 to subsurface formation 20, such as to a subterranean reservoir 200 thereof, and horizontal production well 45 may supply reservoir fluid 209, as produced fluid 210, to surface region 102. Subterranean reservoir 200, which as indicated may include oil-bearing strata 204, may include a plurality of sub-regions 212, such as high permeability region 214 and low permeability region 218, which may be separated by interface region 222. The horizontal portion of horizontal injection well 55 may be located substantially within high permeability region 214, while the horizontal portion of horizontal production well 45 may be located substantially within low permeability region 218. Injected fluid 152 may flow from injection well 55 and may sweep reservoir fluids 209 from subsurface formation 20 and into horizontal production well 45.

While only one horizontal injection well 55 and one horizontal production well 45 are shown in the schematic illustrative, non-exclusive example of FIG. 2, it is within the scope of the present disclosure that hydrocarbon production system 10 may include a plurality of horizontal injection wells and/or a plurality of horizontal production wells. Although not required to all hydrocarbon production systems, these wells may be paired, with the horizontal portion of one well located vertically above the horizontal portion of the other well, as shown in FIG. 2. However, it is also within the scope of the present disclosure that they may be arranged in any other suitable geometry, and/or relative numbers, such as orientations in which the horizontal portions of the wells are substantially parallel but spaced-apart horizontally, orientations in which the horizontal portions of the wells are at skew angles relative to one another, and/or orientations in which there are more production wells than injection wells, more injection wells than production wells, and/or one or more production and injection wells.

In addition, while FIG. 2 schematically depicts a single high permeability region 214 vertically above a single low permeability region 218, it is within the scope of the present disclosure that any number of sub-regions 212 may be present in any configuration. Thus, low permeability region 218 may be vertically above high permeability region 214, and/or subsurface formation 20 may include a plurality of low permeability regions 218 and/or a plurality of high permeability regions 214. Each of these sub-regions may, but is not required to, include at least the horizontal portion of one or more injection and/or one or more production wells. It is also within the scope of the present disclosure that the average injection depth 154, and/or the average production depth 130 may be at any suitable depth and/or that any suitable length of well 30 be exposed to oil-bearing strata 204.

While the illustrative, non-exclusive examples of hydrocarbon wells 30 according to the present disclosure shown in FIGS. 1 and 2 may be effective at recovering oil from certain subsurface formations 20, they may be less effective when subsurface formation 20 (and/or a subterranean reservoir 200 thereof) includes a plurality of sub-regions 212 of varying permeability, particularly where the sub-regions have distinctly contrasted permeabilities, such as described herein. Under these conditions, and as discussed herein, the flow of injected fluids 152 from an injection well to the production well may form complex flow patterns, such as depending on the permeability and geometry of the sub-regions. These flow patterns may result in increased flow of injected fluid, and thus increased sweeping of reservoir fluids in some sub-regions, while also resulting in decreased, or even no, flow (and thus reduced or no sweeping) of reservoir fluids in other sub-regions.

Figure 3:
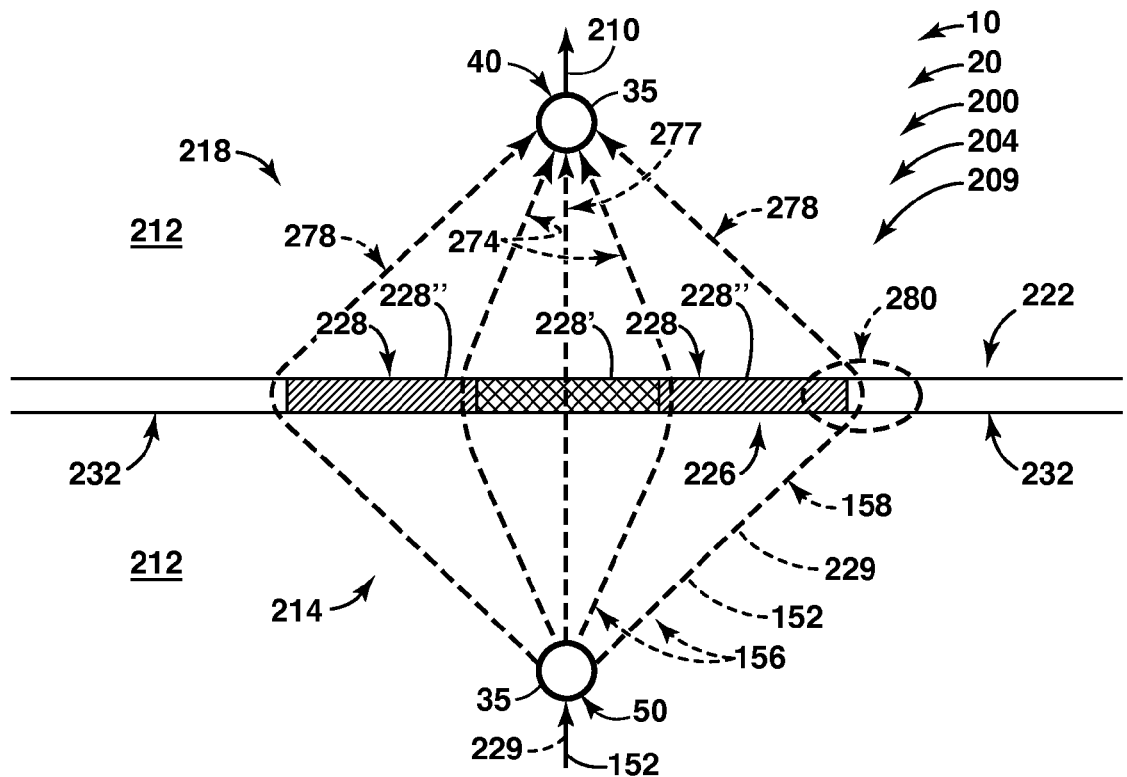
FIG. 3 is an illustrative, non-exclusive schematic example of an interface barrier formation mechanism according to the present disclosure.

As an illustrative, non-exclusive example, FIG. 3 schematically depicts a hydrocarbon production system 10 with a subsurface formation 20 containing a subterranean reservoir 200 that contains oil-bearing strata 204. The subterranean reservoir contains reservoir fluid 209, which as discussed herein, may include oil and/or other hydrocarbons. Subterranean reservoir 200 is depicted as including a plurality of sub-regions 212, including at least a high permeability region 214, a low permeability region 218, and an interface region 222 between the high permeability region and the low permeability region. The following discussion will refer primarily to the subterranean reservoir 200 of subsurface formation 20 for the purpose of illustration, but it should not be construed to limit or preclude use of the disclosed systems and/or methods within a subsurface formation, or portion thereof, that does not include a subterranean reservoir 200. The schematic depiction of a portion of a subterranean reservoir 200 in FIG. 3 is not intended to require or indicate a particular relative orientation, size, and/or geometry between the illustrated subject matter. As such, FIG. 3 is not intended to be limited to a horizontally oriented barrier region, with at least one high permeability region below (and/or above) at least one low permeability region.

As schematically indicated in FIG. 3, subterranean reservoir 200 may receive injected fluid 152 into sub-regions 212, such as from a completion well section 35 or other suitable portion of an injection well 50. Likewise, subterranean reservoir 200 may produce produced fluid 210 from and/or through the sub-regions, such as via a completion well section 35 or other suitable portion of a production well 40. As discussed herein, the injected fluid may be, or may include, steam and/or (liquid) water, although other injected fluids (liquids and/or gases) and/or substances may be used, such as the solutions and/or other mixtures of an injected fluid and a pore throat blocking agent that are discussed in more detail herein. In addition, the produced fluid may be, or may include, reservoir fluid 209, such as oil and/or other hydrocarbons or fluids from within the subterranean reservoir. Internal to sub-regions 212 may be one or more swept regions, from which injected fluid 152 has swept, or removed, at least a substantial portion of the recoverable oil from the sub-region, as well as one or more unswept regions, in which at least a significant portion, or even all, of the nominally (and/or potentially) recoverable oil remains.

As schematically illustrated in FIG. 3, interface region 222 may include native interface region 232. Native interface region 232 may include the interface and/or transition region naturally present between sub-regions 212. In general, native interface region 232 may enable, or permit, fluid communication (i.e., fluid flow) between sub-regions, such as high permeability region 214 and low permeability region 218. This fluid flow between the high and low permeability regions may be referred to herein as inter-region flow. It is within the scope of the present disclosure that interface region 222 may include an interface region permeability that may be greater than the permeability of the high permeability region, less than the permeability of the high permeability region, greater than the permeability of the low permeability region, or less than the permeability of the low permeability region. It is also within the scope of the present disclosure that the permeability of the interface region may vary spatially.

According to systems and/or methods of the present disclosure, and as discussed herein, interface region 222 also may include barrier region 226 and the barrier 228 thereof. Barrier 228 may be created and/or utilized to limit and/or decrease the magnitude of such inter-region flows. The formed barrier may additionally or alternatively be referred to as a hydraulic barrier and/or a fluid flow barrier between the high and low permeability (sub-)regions. It is within the scope of the present disclosure that barrier region 226 may be created in situ using the systems and methods described herein. Thus, the size of barrier region 226 (and/or the barrier 228 thereof) may vary with time, such as by increasing over time the thickness and/or area of the barrier region. As an illustrative, non-exclusive schematic example, and as described in more detail herein, barrier region 226 may include barrier 228' at a given time. At a later time, barrier region 226 may include barrier 228', as well as one or more portions of additionally formed barrier, which are schematically indicated in FIG. 3 at 228".

As illustrated in FIG. 3, injection well 50 (such as an injection well completion section 35 thereof) may inject or otherwise supply a pore throat blocking stream 156, which includes injected fluid 152 and a pore throat blocking agent 229, to subterranean reservoir 200 of subsurface formation 20, such as to high permeability region 214 thereof. The injected pore throat blocking stream, which as discussed herein may additionally or alternatively be referred to herein as a stream of a pore throat blocking mixture 158, may flow from injection well 50 toward production well 40, and while doing so may sweep reservoir fluid from the subterranean reservoir. At interface region 222 between high permeability region 214 and low permeability region 218, at least a portion of pore throat blocking agent 229 may be removed from injected fluid 152 and deposited within subterranean reservoir 200 as and/or at barrier 228, which forms a portion of barrier region 226. This barrier formation is caused by the pore blocking stream being designed or otherwise selected such that it contains a pore throat blocking agent that is sized to largely filter out as it tries to pass through pore throats in the lower permeability region 218 but largely flows freely through the pore throats in higher permeability region 214.

Initially, a sizeable portion of flow from injection well 50 may flow directly toward production well 40 along a path of least resistance. This initial flow is schematically illustrated in FIG. 3 at 277. In time, however, permeability at the interface region 222 decreases and such a path is reduced by the filtering out of the pore throat blocking agent from the injected fluid to form, and/or increase the size of, barrier 228 and/or barrier region 226. As discussed, the size of barrier region 226 may increase with time as more pore throat blocking agent 229 is deposited and/or otherwise retained within the subterranean reservoir, and thus removed from the injected fluid of the pore throat blocking stream. Thus, at a given time, the barrier may have a size, such as indicated by barrier 228', and the flow of injected fluid through interface region 222 may divert around the barrier to follow the corresponding path of least resistance in view of the created barrier. In FIG. 3, this fluid flow path is schematically illustrated by paths 274. It should be understood that flow between the sub-regions and/or between the injection and production wells does not occur in a single discrete path, and accordingly, the graphical representations of flows paths, such as paths 274 and 277 in FIG. 3, are instead schematic depictions of dominant, or general, flow paths.

As flow of pore throat blocking stream 156 continues, additional pore throat blocking agent 229 will be filtered out or otherwise removed from the stream, resulting in growth and/or expansion of the barrier, such as along the interface region 222. This expanded barrier is graphically indicated at 228". As the barrier expands, the injected fluid may be further diverted as it flows from the injection well to the production well. This is schematically illustrated in FIG. 3 with fluid flow path 278. As additional pore throat blocking agent 229 is deposited and/or otherwise retained within subterranean reservoir 200, barrier region 226 may continue to grow, decreasing the size of native interface region 232, modifying the fluid flow path through the subsurface formation, and/or further restricting flow between high permeability region 214 and low permeability region 218.

It is within the scope of the present disclosure that barrier region 226 may be of any suitable size and/or that its size may vary with time. As used herein, size may mean, and/or refer to, the area of interface region 222 that includes barrier region 226. Stated another way, as the size of barrier region 226 increases, the portion of native interface region 232 that does not include pore throat blocking agent may decrease. Thus, barrier region 226 may be present and/or restrict inter-region flow within 0% to 100% of interface region 222, such as within 5%, 10%, 25%, 50%, 75%, 90%, 95%, or 99% of the interface region. While barrier region 226 has been described as being contained within interface region 222, it is within the scope of the present disclosure that the barrier region be present at any suitable location that may occlude, restrict, and/or reduce fluid flow between the low permeability region and the high permeability region. Thus, barrier region 226 may be present within interface region 222, partially within interface region 222 and another sub-region 212, or completely within a sub-region 212. As an illustrative, non-exclusive example, the barrier region may be contained partially within interface region 222 and partially within low permeability region 218.

Figure 4:
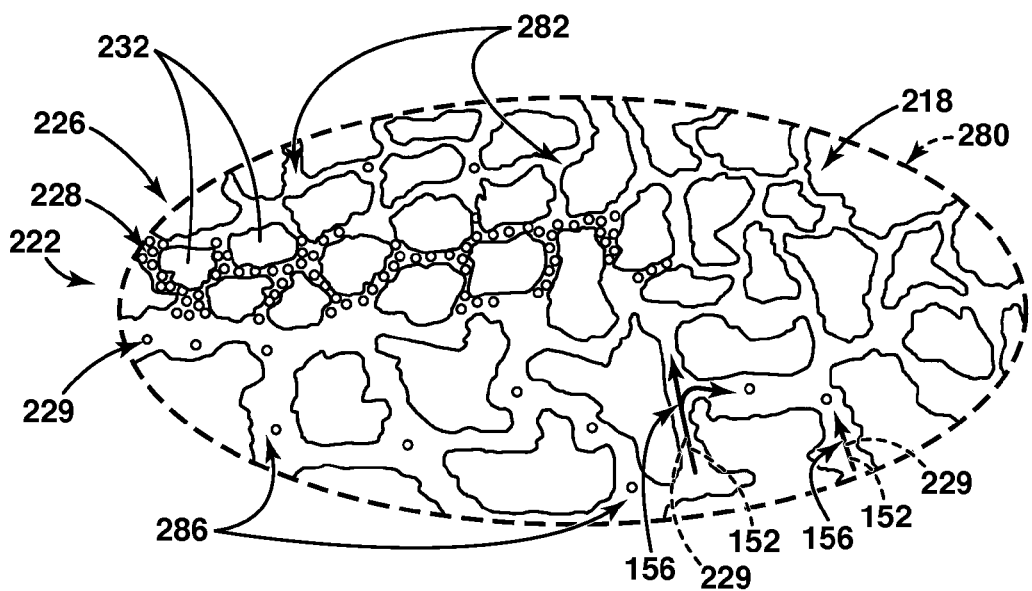
FIG. 4 is a schematic detail of a portion of the barrier of FIG. 3.

FIG. 4 illustrates a magnified, although still schematic, view of a portion of barrier 228 that was shown in FIG. 3, as taken around region 280 in FIG. 3. FIG. 4 graphically illustrates an illustrative, non-exclusive example of barrier formation according to the present disclosure. As shown in FIG. 4, low permeability region 218 may include low permeability pores 282, the average pore throat size of which may be smaller than the average pore throat size of high permeability pores 286 contained within high permeability region 214. Pore throat blocking agent 229 may be designed or otherwise sized and/or selected to flow through the average high permeability pore throat size, while restricting, blocking, and/or occluding the average low permeability pore throat size.

Thus, as pore throat blocking agent 229 flows, is transported, or otherwise travels from the high permeability region to interface region 222, the smaller pores of the interface region and/or low permeability region 218 may be blocked or otherwise at least partially occluded by the pore throat blocking agent. As the concentration of pore throat blocking agent within interface region 222 increases, the hydraulic flow barrier 228 may be formed and/or expanded.

In FIG. 4, the magnified detail schematically illustrates a portion of interface region 222 that contains a barrier region 226 with a barrier 228 that cooperates with native interface region 232 to block, or occlude the pores in and/or proximate the low permeability region. As schematically illustrated, pore throat blocking agent 229 that has been deposited, adsorbed, filtered out or otherwise removed from the pore throat blocking mixture 156 obstructs the flow of fluid, such as injected fluid 152, through low permeability pores 282. The magnified detail of FIG. 4, also schematically illustrates a portion of interface region 222 in which the barrier is still being formed by the pore throat blocking agent. In this region, fluid, such as injected fluid 152, may still flow from the high permeability region to the low permeability region (through interface region 222). When a pore throat blocking stream 152 contains the injected fluid and pore throat blocking agent 229, this pore throat blocking agent may be removed from the fluid at the interface region to create and/or expand the barrier.

As used herein, the term "high permeability pore" is intended to mean a pore in the high permeability region and the term "low permeability pore" is intended to mean a pore in the low permeability region. Furthermore, as used herein, the term "high permeability pore throat" is intended to mean a pore throat in the high permeability region that contributes to the permeability of that region. Likewise, and as used herein, the term "low permeability pore throat" is intended to mean a pore throat in the low permeability region that contributes to the permeability of that region. Average pore throat sizes may be determined by a number of mechanisms known in the art, such as analysis of capillary flow curves, microscopy, fitting of parameters to porous flow models (e.g., the well-known Blake-Kozeny equation), etc. Pore size averages may reflect number averages or, perhaps more preferably, reflect averages weighted by the relative amount of flow passing through given pore throats.

As discussed herein, this barrier may decrease and/or restrict the flow of injected fluid 152 and/or reservoir fluid through the interface region. Additionally or alternatively, the barrier may completely stop, block, or otherwise prevent the flow of fluid through the portion of the interface region that includes the barrier. Thus, flow may be directed away from the portion of interface region 222 that includes barrier 228 to native interface regions 232, which may then be blocked and/or occluded by pore throat blocking agent 229. This barrier propagation and growth process may increase the overall integrity of the barrier layers since any discontinuities or high permeability flow paths in the barriers may draw stream 156 (and thus additional pore throat blocking agent 229) through them, which may increase the concentration of pore throat blocking agent in the vicinity of the discontinuity and decrease fluid flow through the discontinuity.

Placing a barrier at an interface between high and low permeability regions may effectively create separate, isolated reservoirs that may be produced using conventional techniques and larger well spacing than may be utilized without the presence of the barrier. This may increase sweep efficiency, as well as the overall recovery of oil from the reservoir. Accordingly, it may be economical to create a barrier even if a high permeability region has already been swept or otherwise produced. This may prevent channeling from the low permeability region to the high permeability region and enable more efficient production of the oil remaining within the low permeability region.

Any suitable pore throat blocking agent 229 for restricting inter-regional flows 246 may be utilized by systems and/or methods according to the present disclosure to form barrier 228. Illustrative, non-exclusive examples of pore throat blocking agents 229 according to the present disclosure may include any suitable polymers, emulsified droplets, sand grains, clay fines, organic compounds, inorganic compounds, minerals, and/or mixtures of the above materials. It is within the scope of the present disclosure that some pore throat blocking agents may be at least partially soluble in injected fluid 152; however it is also within the scope of the present disclosure that some pore throat blocking agents may not be soluble in the injected fluid. Accordingly, the appropriate term to refer to a combination of injected fluid 152 and pore throat blocking agent 229 may vary depending upon the particular composition of these components. In some embodiments, pore throat blocking stream 156 may deliver a solution of injected fluid 152 and pore throat blocking agent 229, whereas in other embodiments the stream may be, or may at least include, a liquid-solid mixture, a liquid-liquid mixture, a suspension, a dispersion, a colloid, and/or a sol of the injected fluid and the pore throat blocking agent. As used herein, the combination of injected fluid 152 and pore throat blocking agent 229 may be referred to generally as a pore throat blocking mixture 158, and this term is intended to include any of the combinations of injected fluid 152 and pore throat blocking agent 229 disclosed herein. Pore throat blocking mixture 158 is indicated in FIG. 3 as being delivered to subterranean reservoir 200 as a pore throat blocking stream 156.

As graphically illustrated in FIG. 4, pore throat blocking agent 229 may occlude low permeability pores 282 in the subsurface formation, or subterranean reservoir thereof, by one or more pore throat blocking mechanisms. Illustrative, non-exclusive examples of pore throat blocking mechanisms according to the present disclosure include physical obstruction of the pore throat and adsorption onto the inner surface of the pore throat. It is further noted that the pore blocking agent may be chosen based on whether the barrier it forms is expected to be robust to backflow. For example, a polymer pore throat blocking agent which adsorbs to the low permeability pore throats may be more difficult to remove by backflow caused by a subsequent pressuring of the low permeability region above the pressure in the high permeability region than a non-adsorbing pore throat blocking agent.

When pore throat blocking agent 229 is, or includes, a pore throat blocking agent that is designed to physically obstruct the pore throat, the average radius of the pore throat blocking agent may be chosen to be comparable in size to the average radius of the pore throats to be obstructed. In some embodiments, the average radius (e.g., radius of gyration) of the pore throat blocking agent may be selected to be less than the average radius of the pore throats to be obstructed. Illustrative, non-exclusive examples of pore throat blocking agent radiuses according to the present disclosure include radiuses that are at least 20% of the average pore throat radius, such as radiuses of at least any of 25%, 33%, 50%, 67%, 75%, 100%, 125%, or 150% of the average pore throat radius. It is noted that pore throat blocking agents with radius smaller than a pore throat may still lead to blocking of the pore throat due to bridging caused by multiple agent particles trying to pass through the pore simultaneously. Although the present disclosure is not restricted to the number of such pore throat blocking agent particles that may block a particular pore throat, it typically is rare to bridge a pore throat with more than about 3 particles. As used herein, the term "radius" is used to refer to the size of the pore throats within the subsurface formation and/or the size of the pore throat blocking agents. However, and as should be appreciated, not all pores and/or pore throat blocking agents will be cylindrical or spherical, and as such may not have a specific radius. This term is intended to refer to the relative size of the pore and/or pore throat blocking agent, and it is within the scope of the present disclosure that the relative dimensions described herein in the contexts of radii, may additionally or alternatively be referred to in terms of cross-sectional areas, minimum dimensions, minimum cross-sectional dimensions, average dimensions, average sizes, and/or dimensions.

The actual pore throat blocking agent radius utilized in a given subsurface formation, or subterranean reservoir thereof, may be based on one or more of a variety of factors. Illustrative, non-exclusive examples of such factors include the nature of the pore throat blocking agent, the nature of any interactions between individual pore throat blocking agents, the nature of any interactions between the pore throat blocking agent and the surfaces that the pore throat blocking agent may contact within the subsurface formation, the average radius of the high permeability pore throats, the average radius of the low permeability pore throats, and/or any differences in the interfacial or surface chemical characteristics of the high permeability pore throats when compared to the low permeability pore throats. As an illustrative, non-exclusive example, the radius of the pore throat blocking agent may be chosen to be at least one-third (i.e., one-third or greater than one-third) of the radius of the average low permeability pore throat, but also be chosen to be no more than one-fifth (i.e., one-fifth or less than one-fifth) of the radius of the average high permeability pore throat. This size range may increase the likelihood of blocking the throats of low permeability pores 282 while at the same time decrease the likelihood of blocking the throats of high permeability pores 286. Thus, for a subsurface formation wherein the average high permeability pore throats are ten times larger than the average low permeability pore throats, the pore throat blocking agent may be chosen to be (one-third or greater than one-third) but less than twice the radius of the low permeability pore throats. It should be understood that when comparing averages between the high permeability pore throats and low permeability pore throats, the averages may reflect similar averaging schemes and/or may be obtained via similar measurement methods.

When pore throat blocking agent 229 includes pore throat blocking agents that are designed to adsorb (either physically or chemically) onto the inner (and/or other fluid-exposed) surface of the pore throat, the pore throat blocking agent may be chosen such that it will adsorb to the inner surface of the low permeability pore throats but not adsorb to the inner surface of the high permeability pore throats. As an illustrative, non-exclusive example, when the interfacial or surface chemical characteristics of the low permeability pore throats differ from the characteristics of the high permeability pore throats, the pore throat blocking agent may be selected such that it is attracted to (and/or adsorbed to) the inner surface of the low permeability pore throats but not to the inner surface of the high permeability pore throats. As another illustrative, non-exclusive example, a delivery vehicle such as, for example, a micelle or emulsion, may be used to deliver the pore throat blocking agent to interface region 222. The delivery vehicle may be designed and/or selected such that it does not release the pore throat blocking agent within the high permeability pore throats but that it does release the pore throat blocking agent within the low permeability pore throats. The delivery vehicle may additionally or alternatively be referred to as a delivery mechanism. This selective release may be based on a variety of factors and/or properties internal to the pore throats, such as the average radius of curvature of the pore throat, the chemical composition of the pore throat surface, and/or the liquid shear rate within the pore throat.

As discussed herein, pore throat blocking agents 229 according to the present disclosure may be delivered to interface region 222 as a pore throat blocking stream 156, which includes a solution or other mixture or combination of one or more pore throat blocking agents 229 and injected fluid 152. The fluid portion of stream 156 (and thus pore throat blocking mixture 158) may include water or any other suitable injection liquid. Pore throat blocking stream 156 may include or comprise less than 10% of the pore throat blocking agent by weight, such as less than 7%, less than 5%, less than 3%, less than 1% or less than 0.1% of the pore throat blocking agent by weight. The viscosity of the stream 156 (and thus of mixture 158) may be similar to the viscosity of the injected fluid without the pore throat blocking agent present, which may decrease the pumping costs associated with supplying the pore throat blocking stream to the subterranean reservoir. As an illustrative, non-exclusive example, when the injected fluid includes a pore throat blocking mixture 158 in the form of an aqueous solution of pore throat blocking agent in water, the viscosity of the solution may be less than 5 times the viscosity of water at a shear rate of 1 $s^{-1}$ and reservoir temperature. This may include viscosities of less than 4 times, less than 3 times, less than 2 times, or less than 1.5 times the viscosity of water at a shear rate of 1 $s^{-1}$ and reservoir temperature.

When pore throat blocking agent 229 includes a polymer or polymeric material that is adapted to physically block the low permeability pore throats, the polymer may be designed or otherwise selected to be soluble in injected fluid 152, reservoir fluid 209, or both. In addition, and as discussed herein, the radius of gyration (or average radius) of the polymer in pore throat blocking mixture 158 may be designed to be at least 20% of the radius of the average pore throats to be blocked, including radiuses of greater than 25%, greater than 33%, greater than 50%, greater than 75%, or greater than 100% of the average radius of the pore throats to be blocked. The polymer also may be designed to have at least a minimum as-injected molecular weight, including molecular weights that are greater than 100,000 Daltons, such as molecular weights of greater than 1,000,000, or greater than 10,000,000 Daltons. It is also within the scope of the present disclosure that the polymer may be designed to be non-reactive with materials contained within the subterranean formation and/or with other polymer molecules. Thus, the individual polymer molecules may not (or at least may only minimally) chemically react within the subsurface formation.

Additionally or alternatively, it is within the scope of the present disclosure that the polymer may be specifically designed to react within the subterranean formation, either with materials contained within the subterranean formation and/or with other polymer molecules. As an illustrative, non-exclusive example, the polymer molecules may be designed to cross-link with other polymer molecules once they have blocked the low permeability pore throats, thereby increasing their average molecular weight and making their removal from the pore throats more difficult. As another illustrative, non-exclusive example, the polymer molecules may be designed to chemically react with the inner surface of the low permeability pore throats, such as by bonding to the surface and making their removal from the pore throats more difficult.

It is further within the scope of the present disclosure that the polymer molecules may form strong physical interactions with materials contained within the subterranean reservoir and/or with other polymer molecules. Similar to the chemical reactions described herein, these physical interactions may make it more difficult to remove the polymer molecules from the pore throats. As an illustrative, non-exclusive example, the strength of adsorption of the polymer molecules onto the rock surface of the subterranean reservoir may be varied by adjusting the degree of hydrolysis of the polymer molecules. Generally, decreased hydrolysis may increase the adsorption strength on rock surfaces, though very low degrees of hydrolysis may result in significant loss of polymer to surface adsorption within the high permeability region.

When pore throat blocking agent 229 includes emulsified droplets that are adapted to physically block the low permeability pore throats, the emulsified droplets may be designed to remain stable within the injected fluid, such as water, within the reservoir fluid, or both. As discussed herein, a characteristic dimension of the emulsified droplets, such as the volume-weighted radius, may be chosen to be greater than a predetermined fraction of the average radius of the pore throats to be blocked. These include characteristic dimensions that are at least 20% of the average low permeability pore throat radius, as discussed herein.

It is within the scope of the present disclosure that the emulsified droplets may include chemical and/or physical components to enhance their stability in pore throat blocking mixture 158. These components may include surfactants, asphaltic components, and/or solid particles, such as solid microparticles and/or solid nanoparticles (Pickering emulsions), that may decrease the likelihood of droplet rupture and/or coalescence by forming protective barriers on the droplet surface. As such, the emulsified droplets may additionally or alternatively be described as being stabilized, or at least partially stabilized, by the surfactants and/or solid particles.

There are a number of methods that may be used to control the droplet size in emulsions (see. e.g., P. Walstra, "Principles of Emulsion Formation", *Chem. Eng. Sci.*, 48(2), 333-349, 1993). In general, droplet size may be largely controlled by the shear stress experienced during droplet creation and/or by the interfacial surface tension of the droplet. Shear stress may be controlled by the mixing rate and/or flow gap size in emulsion generating equipment and interfacial surface tension may be modified through the addition of surfactant chemicals. The final droplet size distribution of an emulsion generated via vigorous mixing and/or agitation may represent the competition of three processes: disruption, coagulation, and stabilization. Disruption is the process by which a large droplet separates into several smaller droplets. For most sheared or mixed systems, the primary mechanism may be local shear pressures overwhelming a droplet's Laplace pressure. Typically, emulsions may be generated using simple shear imparted by flow through narrow gaps between rotating surfaces, although other methods are also within the scope of the present disclosure.

As discussed herein, barrier 228 may be created and thereafter utilized to control and/or redirect the flow of fluid within subsurface formation 20, such as in a subterranean reservoir 200 thereof, which may increase oil recovery from the subsurface formation. An illustrative, non-exclusive example of a system for forming barrier 228 and producing oil from subterranean reservoir 200 according to the present disclosure is shown schematically in FIG. 5. As shown, subterranean reservoir 200 includes a high permeability region 214 and a low permeability region 218. In this illustrative, non-exclusive example, an injection well 50, such as horizontal injection well 55 (or well completion section thereof), is depicted as being located within high permeability region 214, while production wells 40, such as horizontal production wells 45 (or well completion section(s) thereof), are depicted as being located within low permeability region 218. Horizontal well spacing 294 may separate injection well 50 from at least one production well 40. It is within the scope of the present disclosure that horizontal well spacing 294 may vary, both within a specific subsurface formation, subterranean reservoir, from formation to formation, and/or from reservoir to reservoir. Illustrative, non-exclusive examples of factors that may influence well spacing include the absolute and/or relative permeability of the subsurface formation, the absolute and/or relative permeability of the subterranean reservoir, the desired drainage time, and/or well construction costs. Illustrative, non-exclusive examples of horizontal well spacing 294 according to the present disclosure include horizontal well spacing of 0 to 10,000 meters, including horizontal well spacing of at least any of 10, 100, 250, 500, 750, 1,000, 2,500, 5,000, and 7,500 meters, although spacing outside of these values is also within the scope of the present disclosure.

Subterranean reservoir 200 may further include interface region 222, which may separate high permeability region 214 from low permeability region 218. Initially, interface region 222 may comprise native interface region 232, without barrier region 226 present. A pore throat blocking stream 156 of injected fluid 152, such as (liquid) water, and a pore throat blocking agent 229 may be injected into the subsurface formation, such as into the subterranean reservoir shown in FIG. 5. Initially, the pore throat blocking mixture 158 delivered in stream 156 may follow flow path 270 through the subsurface formation from injection well 50 to production well(s) 40. However, and as described herein, pore throat blocking agent 229 may accumulate or otherwise build up at interface 222, leading to the formation and subsequent expansion, or extension, of barrier 228 and barrier region 226. The formation of barrier 228 (such as the portion of the barrier indicated at 228') may cause the injected pore throat blocking mixture to flow around the barrier, thereby creating new flow path 274, depositing the pore throat blocking agent in previously native interface regions, and increasing the size of barrier region 226. At some later time, barrier region 226 may include additionally deposited barrier (as indicated at 228"), and the flow of injected fluid may follow flow path 278. As additional pore throat blocking agent is injected into the subterranean reservoir of the subsurface formation, the size of barrier 228 and barrier region 226 may increase even further, such as indicated schematically at 228''', thereby decreasing the portion of interface region 222 that includes native interface region 232 and which does not include pore throat blocking agent. This barrier formation may eventually lead to complete, or at least substantially complete, hydraulic isolation of high permeability region 214 from low permeability region 218, such as when region 228''' is formed.

Concurrent with the creation and expansion of barrier region 226 within subsurface formation 200, reservoir fluids may be swept from the subterranean reservoir and into production wells 40. As may be seen in FIG. 5, the creation and expansion of barrier region 226 may cause the fluid flow profile within the subterranean reservoir to change with time. This may, in turn, cause portions of subterranean reservoir 200 to be swept by the injected fluid that were not previously swept, increasing the overall oil recovery from the subsurface formation. After the formation of barrier region 226 is completed, it is within the scope of the present disclosure that one or more subsurface regions, such as high permeability region 214 and/or low permeability region 218 may be substantially, or even completely, swept. It is also within the scope of the present disclosure that additional fluid sweep may be utilized to increase hydrocarbon recovery, such as to sweep reservoir fluids from unswept region 238.

Figure 5:
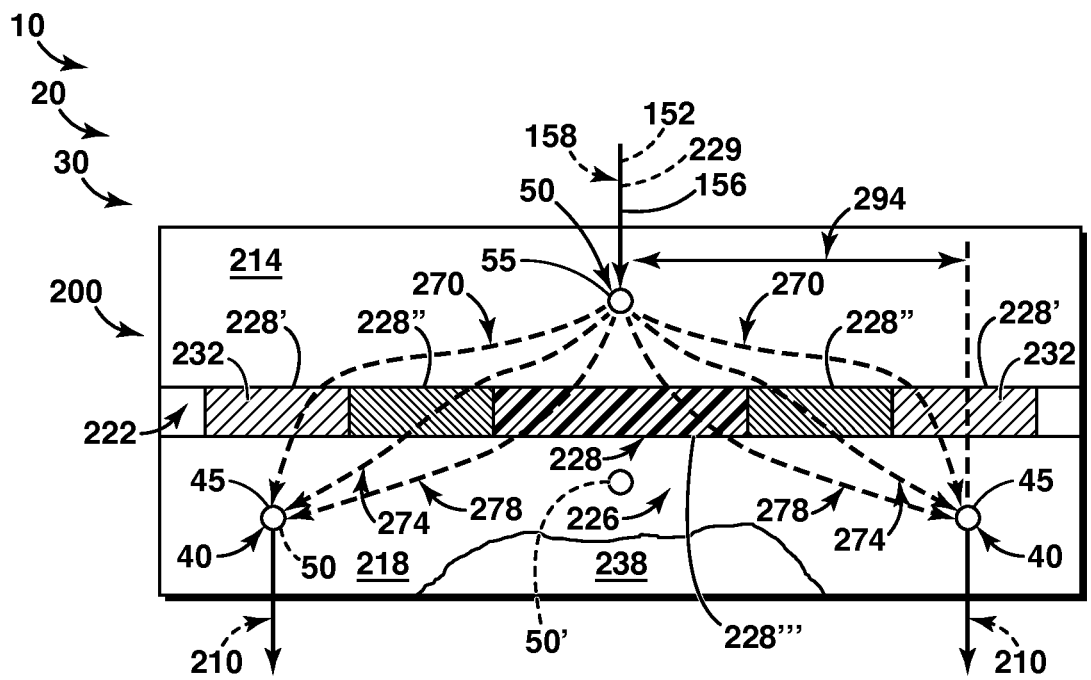
FIG. 5 is an illustrative, non-exclusive schematic example of a well geometry that may be utilized according to the present disclosure.

As an illustrative, non-exclusive example, it is within the scope of the present disclosure that high permeability region 214 may be completely or substantially swept during the formation of barrier region 226 and barrier 228 and may contain very little recoverable oil. However, low permeability region 218 may only be swept in the vicinity of production wells 40 and may thus include a substantial quantity of recoverable oil. It is within the scope of the present disclosure that the formation of barrier region 226 may enable waterflooding of (and/or the use of another secondary oil recovery technique in) low permeability region 218 independent from high permeability region 214 by decreasing and/or eliminating channeling from the low permeability region to the high permeability region. Thus, one or more of the production wells 40 contained within low permeability region 218 may be converted to an injection well 50, as schematically indicated in dashed lines with reference numeral 50 associated with one of the production wells 40. Additionally or alternatively, one or more new production wells (or well sections) may be completed in the low permeability region to assist in this recovery process. This is schematically illustrated in FIG. 5 by production well 50'. Waterflooding of low permeability region 218 may then be completed without significant channeling into high permeability region 214, thus increasing the recovery of reservoir fluids from the low permeability region. Additionally or alternatively, new injection and/or production wells may be drilled into the high permeability region and/or the low permeability region subsequent to barrier formation to facilitate efficient sweep of the region(s).

Figure 6:
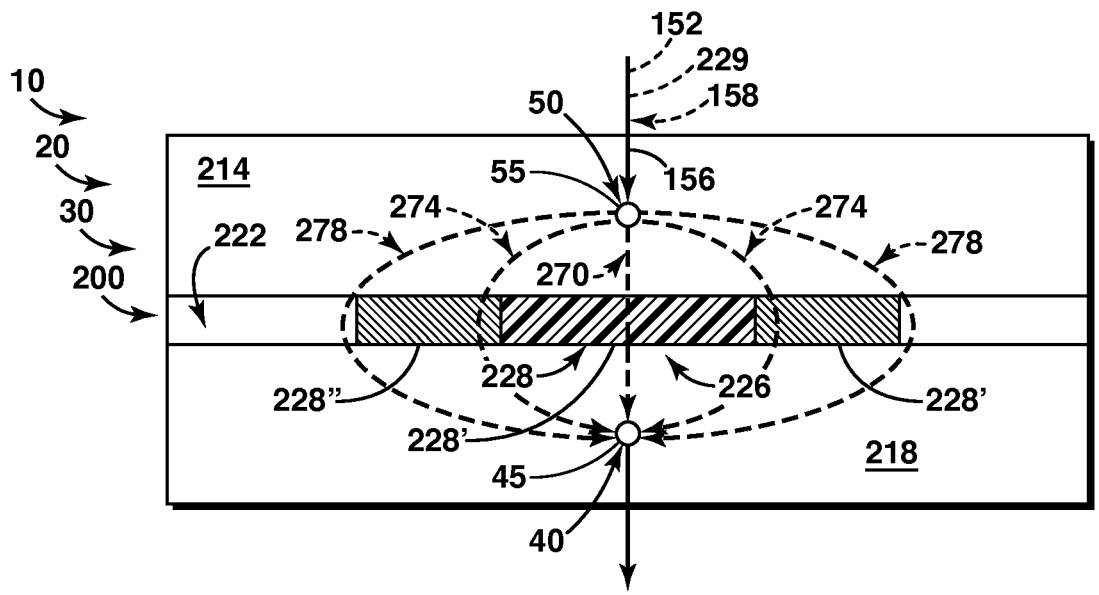
FIG. 6 is another illustrative, non-exclusive schematic example of a well geometry that may be utilized according to the present disclosure.

Another illustrative, non-exclusive example of a system for forming barrier 228 and producing oil from subsurface formation 200 is shown schematically in FIG. 6. The system of FIG. 6 is substantially similar to the system of FIG. 5, except that the illustrated injection and production wells 50 and 40, which may be a horizontal injection well 55 and a horizontal production well 45 are substantially parallel and located on a substantially vertical plane. It is within the scope of the present disclosure that horizontal injection well 55 and horizontal production well 45 may not be completely parallel and/or that they may be separated by a distance when projected onto a horizontal plane. Illustrative, non-exclusive examples of this separation distance include separation distances of less than 30 meters, such as separation distances of less than 25 meters, less than 15 meters, less than 10 meters, less than 5 meters, or less than 1 meter.

The formation of barrier region 226 may proceed substantially as described herein with respect to FIG. 5. However, the location of injection well 55 and production well 45 on a substantially vertical plane may enable efficient sweep of both high permeability region 214 and low permeability region 218 while the barrier region is being formed and subsequently expanded. As shown in FIG. 6, this may be due to the symmetrical flow of injected fluids and reservoir fluids between the injection well and the production well. Thus, the formation of barrier region 226 may increase the sweep efficiency within both high permeability region 214 and low permeability region 218. It is within the scope of the present disclosure that, after barrier region 226 has been completely formed, there may not be a need to perform additional, independent sweeps of the high and low permeability regions. However, it is also within the scope of the present disclosure that, subsequent to the formation of barrier region 226, the high and/or low permeability regions may be swept independently as discussed with reference to FIG. 5. This may involve drilling additional injection and/or production wells into the low and/or high permeability regions, converting existing injection wells into production wells, and/or converting existing production wells into injection wells.

Figure 7:
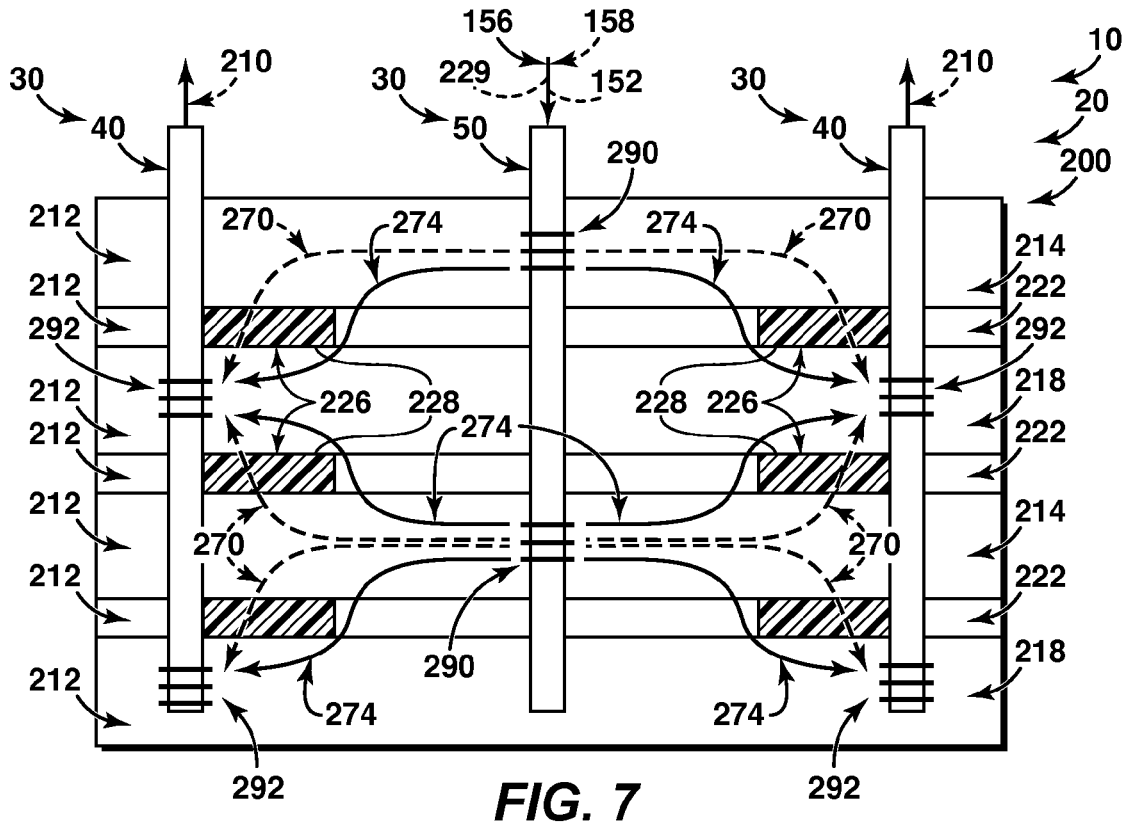
FIG. 7 is an illustrative, non-exclusive schematic example of a vertical well geometry that may be utilized according to the present disclosure.
Figure 8:
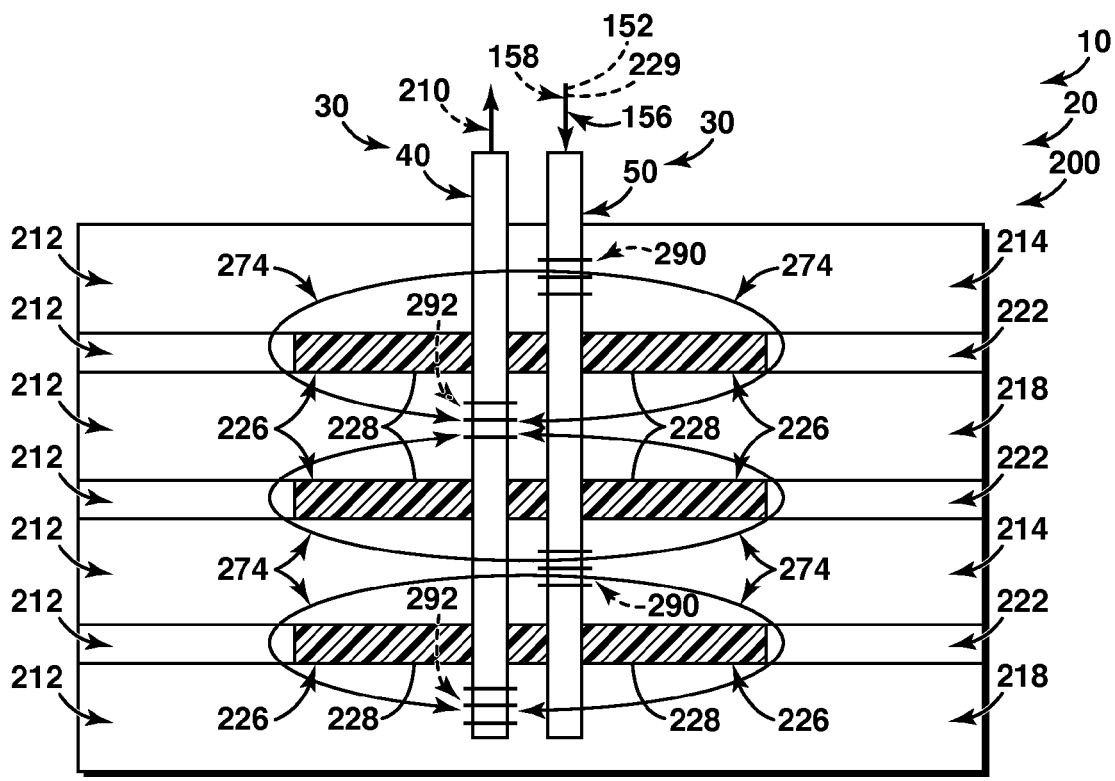
FIG. 8 is another illustrative, non-exclusive schematic example of a vertical well geometry that may be utilized according to the present disclosure.

The systems and/or methods described herein also may be utilized with vertical or slanted well geometries and/or with subsurface formations and/or subterranean reservoirs thereof that include a plurality of high permeability regions and/or a plurality of low permeability regions. This is illustrated schematically in FIGS. 7 and 8. In FIGS. 7 and 8, injection wells 50 and production wells 40 may be drilled into a subterranean reservoir 200 that includes a plurality of sub-regions 212, including a plurality of high permeability regions 214, a plurality of low permeability regions 218, and/or a plurality of interface regions 222. Injection wells 50 may include multiple-completion wells, such that each of the plurality of high permeability regions 214 may include an injection point 290. Similarly, production wells 40 may include multiple-completion wells, such that each of the plurality of low permeability regions 218 may include a production point, 292.

FIG. 7 illustrates a vertical well geometry that may produce injectant and reservoir fluid flow patterns, as well as barrier region growth similar to that described with reference to FIG. 5. Illustrative, non-exclusive examples of well spacing are described with reference to FIG. 5. In FIG. 7, the injection and production wells are spaced horizontally apart and flow of the injected fluid initially may be substantially through the high permeability regions, only entering the low permeability layers when it nears the wellbore, as indicated schematically with fluid flows 270. As barrier 228 is formed, the fluid flow path changes, such as is schematically illustrated with fluid flows 274. Under these conditions, as flow of pore throat blocking stream 156 continues, an effective fluid flow barrier 228 between high and low permeability regions may be formed. As discussed, one or more additional injection wells may need to be drilled into the low permeability regions and/or one or more of the production wells may need to be converted into injection wells for efficient sweep of the low permeability regions.

In contrast, FIG. 8 illustrates a vertical well geometry that may produce injectant and reservoir fluid flow patterns, as well as barrier region growth that is similar to that described with reference to FIG. 6. In FIG. 8, the injection and production wells are spaced horizontally close together and the resultant fluid flow patterns and barrier growth may enable efficient and simultaneous sweep of both the high and low permeability regions, though independent sweep of one or both regions subsequent to barrier formation is within the scope of the present disclosure.

While FIGS. 5-8 show a single injection well and either one or two production wells, it is within the scope of the present disclosure that hydrocarbon production system 10 may include a plurality of spaced-apart injection wells and/or a plurality of spaced-apart production wells that may include completions within a plurality of sub-regions 212. The spacing of these wells may be systematic, random, and/or may be based upon the specific characteristics of subsurface reservoir 200.

Figure 9:
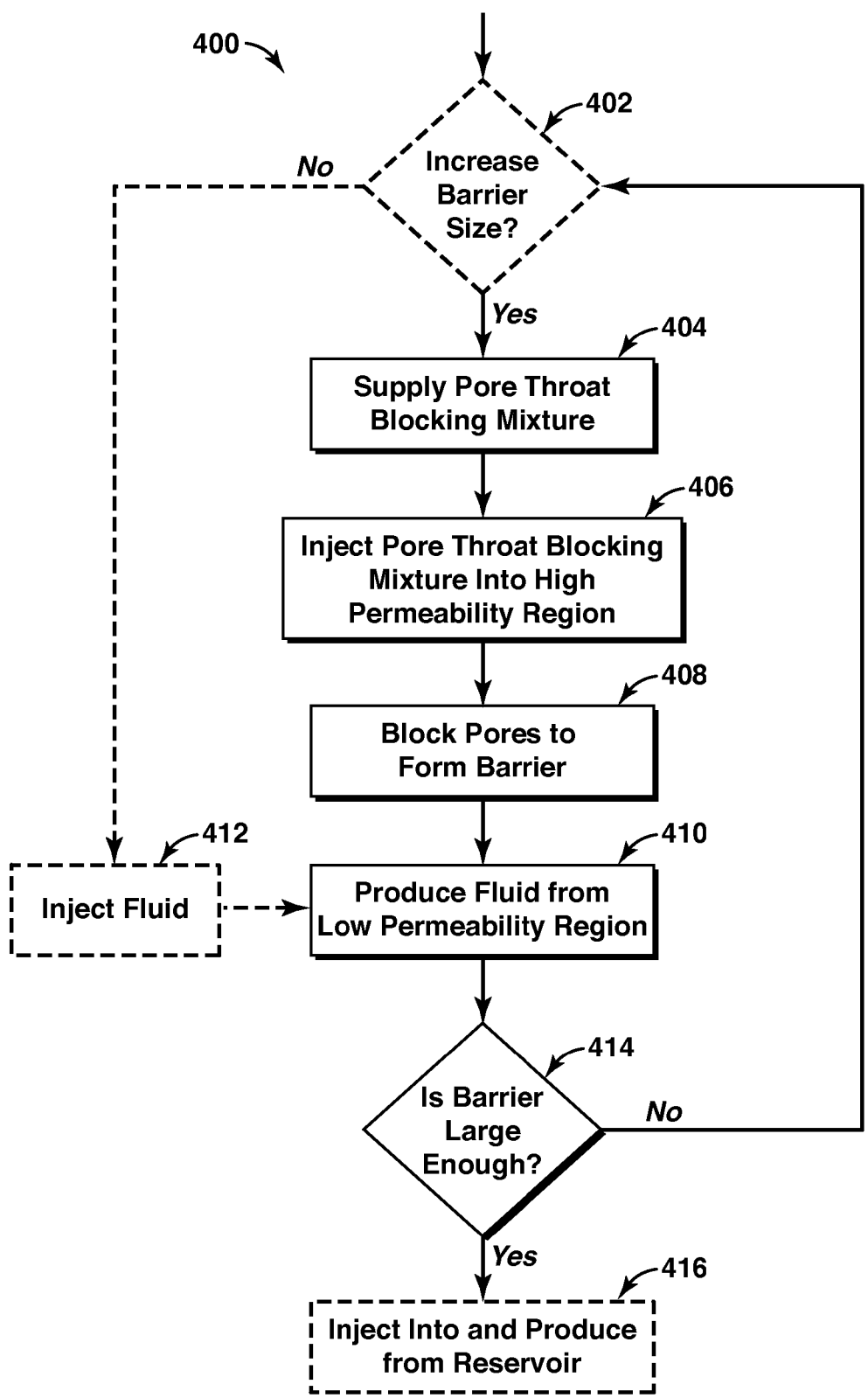
FIG. 9 is a flow chart providing illustrative, non-exclusive examples of methods according to the present disclosure.

The systems disclosed herein may be created and/or utilized with any suitable method. An illustrative, non-exclusive example of a method that may be utilized according to the present disclosure is shown in FIG. 9. FIG. 9 is a flow chart illustrating barrier formation and reservoir fluid production method 400, wherein the size of the barrier may be increased in an incremental and controlled manner. The method may include the step of determining whether or not to increase the size of the barrier region at 402. If the decision is made not to increase the size of the barrier region, the method may follow the "NO" leg to block 412, wherein injected fluid 152 without pore throat blocking agent 229 may be injected into high permeability region 214 and reservoir fluids may be produced from low permeability region 218 at 410.

Alternatively, if the decision is made to increase the size of the barrier region at 402, the method may follow the "YES" leg to block 404, where a pore throat blocking stream 156 of injected fluid 152 and pore throat blocking agent 229 may be supplied and injected into the high permeability region at 406. The pore throat blocking mixture 158 delivered in stream 156 may flow to the interface between the high permeability region and the low permeability region and block pore throats to form a barrier at 408. Concurrently, reservoir fluids may be produced from the low permeability region at 410.

The method may then proceed to decision block 414, wherein the current size of the barrier region may be compared to the desired barrier region size. If the barrier region is not of the desired size, the method may follow the "NO" leg to block 402, where the method may be repeated. If the barrier region is of the desired size, the "YES" leg may be followed to block 416, where additional fluid may be injected into any suitable injection well within the reservoir and reservoir fluids may be produced from any suitable production well within the reservoir, including newly created injection and/or production wells.

As stated herein, method 400 may be utilized to increase the size of barrier region 226 in a controlled and systematic manner, allowing concurrent barrier formation and reservoir sweep. As an illustrative, non-exclusive example, and with reference to FIG. 6, method 400 may include initially supplying injected fluid 152 to sweep the portion of subterranean reservoir 200 between injection well 50 and production well 40 as shown by fluid flow line 270. The method may then include the injection of a pore throat blocking stream 156 of injected fluid 152 and pore throat blocking agent 229 (which as discussed may be referred to as a pore throat blocking mixture 158) to form an initial region of barrier 228, as indicated at 228', and concurrently sweep an additional portion of the subterranean reservoir. After barrier 228 is formed, the method may include further injection of injected fluid 152 to sweep the subterranean reservoir, followed by the injection of additional pore throat blocking mixture 156 until additional regions of barrier 228 have been formed, as indicated at 228". As discussed, the additional regions of the barrier may additionally or alternatively be referred to as expansions or enlargements of the previously existing region of barrier 228. Subsequent to forming additional regions of barrier 228", injected fluid 152 may again be supplied to further sweep the subterranean reservoir. This process may be repeated as necessary until the entire subterranean reservoir has been swept and/or barrier region 226 includes all of interface region 222.

It is within the scope of the present disclosure that barrier region 226 may be formed by continuous injection of the pore throat blocking stream of injected fluid 152 and pore throat blocking agent 229 instead of alternating injection of injected fluid 152 and the pore throat blocking mixture 158. When the injection is alternated, it is within the scope of the present disclosure that any suitable ratio of injected fluid 152 volume to stream 156 volume may be used.

Subsequent to the formation of barrier region 226, and as described herein, it is within the scope of the present disclosure that high permeability region 214 and/or low permeability region 218 may be swept independently. As discussed herein, this may include the conversion of injection wells to production wells, the conversion of production wells to injection wells, the drilling of one or more new wells that are completed within the high permeability region, and/or the drilling of one or more new wells that are completed within the low permeability region. Any of the well configurations described herein may be utilized with any suitable oil recovery technique, including the techniques described herein, such as waterflooding.

While the systems and methods disclosed herein have been described with reference to injecting pore throat blocking agent into the high permeability region and producing reservoir fluids from the low permeability region, it is within the scope of the present disclosure that the pore throat blocking agent may be injected into the low permeability region and/or that reservoir fluids may be produced from the high permeability region. As an illustrative, non-exclusive example, and as described herein, the pore throat blocking agent may be adapted to adhere to or otherwise interact with certain interfacial or surface chemistries but not with others. Under these conditions, it may be desirable to utilize a pore throat blocking agent that will occlude pore throats having a chemistry that is specific to the interface region and/or the high permeability region and effective barrier formation may be accomplished through injection of the pore throat blocking agent into the low permeability region.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A. A method of forming a barrier between a high permeability region and a low permeability region of a subterranean reservoir, wherein the high permeability region is in fluid communication with the low permeability region, the high permeability region includes a plurality of high permeability pores with an average high permeability pore throat radius, the low permeability region includes a plurality of low permeability pores with an average low permeability pore throat radius, and the average high permeability pore throat radius is larger than the average low permeability pore throat radius, the method comprising:

providing a pore throat blocking mixture that comprises, and optionally consists or consists essentially of, water and a pore throat blocking agent, wherein the pore throat blocking agent is adapted, and optionally sized, to pass through the average high permeability pore throat radius but to occlude the average low permeability pore throat radius;

supplying the pore throat blocking mixture to the high permeability region;

flowing at least a portion of, and optionally all or substantially all of, the water of the pore throat blocking mixture through an interface between the high permeability region and the low permeability region, and optionally flowing at least a portion of the pore throat blocking agent through the interface; and occluding a plurality of low permeability pores at the interface to form a macroscopic fluid flow barrier.

A1. The method of paragraph A, wherein the high permeability region includes a high permeability region well completed in the high permeability region, and further wherein the supplying further includes injecting the pore throat blocking mixture into the high permeability region well.

A2. The method of any of paragraphs A-A1, wherein the low permeability region includes a low permeability region well completed in the low permeability region, and further wherein the method further includes producing reservoir fluids from and/or through the low permeability region well.

A3. The method of any of paragraphs A-A2, wherein the pore throat blocking mixture is, or optionally includes, a pore throat blocking solution of the injected fluid and the pore throat blocking agent, and further optionally wherein the pore throat blocking mixture is, or includes, a dilute pore throat blocking solution of the injected fluid and the pore throat blocking agent.

A4. The method of any of paragraphs A-A3, wherein the pore throat blocking agent includes a water-soluble polymer.

A5. The method of paragraph A4, wherein the radius of gyration of the water-soluble polymer in aqueous solution is at least one-third of the average low permeability pore throat radius, and optionally wherein the radius of gyration of the water-soluble polymer in aqueous solution is at least one-half of the average low permeability pore throat radius.

A6. The method of paragraph A5, wherein the radius of gyration of the water-soluble polymer in aqueous solution is greater than the average low permeability pore throat radius.

A7. The method of any of paragraphs A4-A6, wherein the average molecular weight of the water-soluble polymer is greater than 10,000,000 Daltons.

A8. The method of any of paragraphs A-A7, wherein the pore throat blocking agent includes emulsified droplets.

A9. The method of paragraph A8, wherein the emulsified droplets are stabilized, or at least partially stabilized, by a surfactant.

A10. The method of paragraph A8 or A9, wherein the emulsified droplets are stabilized, or at least partially stabilized, by solid particles.

A11. The method of any of paragraphs A8-A10, wherein the average volume-weighted emulsified droplet radius is greater than one-third the average low permeability pore throat radius, and optionally wherein the average volume-weighted emulsified droplet radius is greater than one-half of the average low permeability pore throat radius.

A12. The method of paragraph A11, wherein the average volume-weighted emulsified droplet radius is greater than the average low permeability pore throat radius.

A13. The method of any of paragraphs A-A12, wherein the occluding includes occluding a plurality of low permeability pores at the interface with the pore throat blocking agent.

A14. The method of any of paragraphs A-A13, wherein the occluding does not include chemical reaction of the pore throat blocking agent.

A15. The method of any of paragraphs A-A14, wherein the pore throat blocking agent is, or optionally includes, sand grains and/or clay fines.

A16. The method of any of paragraphs A-A15, wherein the pore throat blocking agent includes at least one of a water-soluble polymer, emulsified droplets, sand grains, and clay fines.

A17. The method of any of paragraphs A-A16, wherein the pore throat blocking mixture comprises a dilute solution of the pore throat blocking agent in water.

A18. The method of paragraph A17, wherein the pore throat blocking agent comprises less than 5 wt % of the solution, optionally less than 3 wt % of the solution, and further optionally less than 1 wt % of the solution.

A19. The method of any of paragraph A11 or A18, wherein the viscosity of the solution is less than twice the viscosity of pure water at a shear rate of 1 $s^{-1}$ and at reservoir temperature.

A20. The method of any of paragraphs A-A19, wherein the pore throat blocking agent comprises less than 5 wt % of the mixture, optionally less than 3 wt % of the mixture, and further optionally less than 1 wt % of the mixture.

A21. The method of any of paragraphs A-A20, wherein the viscosity of the pore throat blocking mixture is less than twice the viscosity of pure water at a shear rate of 1 $s^{-1}$ and at reservoir temperature.

A22. The method of any of paragraphs A-A21, wherein injecting the pore throat blocking mixture includes alternating injecting water, gas, and/or another injected fluid that is free of, at least substantially free of, or does not include the pore throat blocking mixture, and injecting the pore throat blocking mixture.

A23. The method of any of paragraphs A-A22, wherein the macroscopic fluid flow barrier is at least 1 acre (0.4 hectare) in area, optionally at least 5 acres (2.0 hectares) in area, and further optionally at least 10 acres (4.0 hectares) in area.

A24. The method of any of paragraphs A-A23, wherein the macroscopic fluid flow barrier is at least 20 acres (8.1 hectares) in area.

A25. The method of any of paragraphs A2-A24, wherein at least a portion of the high permeability region well includes a high permeability well section within the high permeability region, optionally wherein the high permeability well section is oriented within 15 degrees of horizontal, and further optionally wherein the high permeability well section is horizontally oriented.

A26. The method of any of paragraphs A2-A25, wherein at least a portion of the low permeability region well includes a low permeability well section within the low permeability region, optionally wherein the low permeability well section is oriented within 15 degrees of horizontal, and further optionally wherein the low permeability well section is horizontally oriented.

A27. The method of paragraph A26, wherein a horizontal portion of the high permeability region well section and a horizontal portion of the low permeability region well section are separated by a distance of less than 30 meters, and optionally by a distance of less than 30 meters when the distance is projected onto a horizontal plane.

A28. The method of paragraph A27, wherein the distance is less than 15 meters, and optionally less than 3 meters.

A29. The method of paragraph A27 or A28, wherein the horizontal portion of the high permeability region well section and the horizontal portion of the low permeability region well section are disposed in a substantially vertical plane.

A30. The method of any of paragraphs A26-A29, wherein the high permeability region well section has a high permeability region well completion depth, the low permeability region well section has a low permeability region well completion depth, and further wherein the high permeability region well completion depth is less than the low permeability region well completion depth.

A31. The method of any of paragraphs A26-A29, wherein the high permeability region well section has a high permeability region well completion depth, the low permeability region well section has a low permeability region well completion depth, and further wherein the high permeability region well completion depth is greater than the low permeability completion well depth.

A32. The method of any of paragraphs A-A31 wherein, subsequent to forming the fluid flow barrier, the method further includes injecting water, gas, and/or another injected fluid into the low permeability region and producing reservoir fluids from and/or through the low permeability region.

A33. The method of any of paragraphs A-A32, wherein, subsequent to forming the fluid flow barrier, the method further includes drilling at least a first additional low permeability region well into the low permeability region, and optionally still further includes at least one of producing reservoir fluids from and/or through and supplying injectant to and/or through the at least a first additional low permeability region well in the low permeability region.

A34. The method of any of paragraphs A-A33, wherein, subsequent to forming the fluid flow barrier, the method further includes injecting water into and/or through the high permeability layer and producing reservoir fluids from and/or through the high permeability layer.

A35. The method of any of paragraphs A-A34, wherein, subsequent to forming the fluid flow barrier, the method further includes drilling at least a first additional high permeability region well into the high permeability region, and optionally still further includes at least one of producing reservoir fluids from and/or through and supplying injectant to and/or through the at least a first additional high permeability region well in the high permeability region.

A36. The method of any of paragraphs A-A35, wherein the fluid flow barrier decreases a fluid flow rate across the interface by at least 50%, and optionally by at least 75%, and further optionally by at least 95%.

A37. The method of any of paragraphs A-A36, wherein the method includes occluding at least 75% of the low permeability pores at the interface, and optionally at least 95% of the low permeability pores at the interface.

A38. The method of any of paragraphs A-A37, wherein the average high permeability pore throat radius is at least 10 times larger than the average low permeability pore throat radius, and optionally at least 25 times larger than the average low permeability pore throat radius, and further optionally at least 50 times larger than the average low permeability pore throat radius.

A39. The method of any of paragraphs A-A38, wherein the subterranean region includes a subterranean oil reservoir that comprises a plurality of vertically-stacked regions that include at least a first high permeability region in fluid communication with at least a first low permeability region.

A40. The method of paragraph A39, the method further including producing oil from the subterranean region.

A41. The method of any of paragraphs A-A40, wherein the pore throat blocking agent includes a plurality of pore throat blocking agents.

A42. The use of any of the methods of paragraphs A-A41 to produce oil.

A43. The use of any of the methods of paragraphs A-A42 with any of the systems described herein.

A44. The production of oil by any of the methods of paragraphs A-A41.

A45. Oil produced by any of the methods of paragraphs A-A41.

B. A method for recovering oil from a subterranean reservoir that comprises a plurality of vertically-stacked, and/or optionally at least substantially vertically-stacked, regions that include at least a first high permeability region in fluid communication with at least a first low permeability region, wherein the high permeability region includes a plurality of high permeability pores with an average high permeability pore throat radius, the low permeability region includes a plurality of low permeability pores with an average low permeability pore throat radius, wherein the average high permeability pore throat radius is larger than the average low permeability pore throat radius, and further wherein the at least a first high permeability region includes at least a first high permeability region well and the at least a first low permeability region includes at least a first low permeability region well, the method comprising:
  providing a pore throat blocking mixture that comprises, and optionally consists or consists essentially of, water and a pore throat blocking agent, wherein the pore throat blocking agent is adapted, and optionally sized, to pass through the average high permeability pore throat radius but occlude the average low permeability pore throat radius;
  supplying the pore throat blocking mixture into the at least a first high permeability region well;
  producing reservoir fluids from and/or through the at least a first low permeability region well; and
  continuing the supplying and the producing until a macroscopic fluid flow barrier of at least one acre in area is formed by the pore throat blocking agent at an interface between the high permeability region and the low permeability region.

B1. The method of paragraph B, wherein the supplying and the producing include flowing the pore throat blocking mixture through an interface between the at least a first high permeability region and the at least a first low permeability region.

B2. The method of paragraph B1, wherein the flowing includes occluding a plurality of low permeability pores at the interface.

B3. The method of paragraph B1 or B2, wherein the method includes occluding at least 75% of the low permeability pores at the interface, and optionally at least 95% of the low permeability pores at the interface.

B4. The method of any of paragraphs B-B3, wherein the pore throat blocking mixture is, or optionally includes, a pore throat blocking solution of the injected fluid and the pore throat blocking agent, and further optionally wherein the pore throat blocking mixture is, or includes, a dilute pore throat blocking solution of the injected fluid and the pore throat blocking agent.

B5. The method of any of paragraphs B-B2, wherein the pore throat blocking agent includes a water-soluble polymer.

B6. The method of paragraph B5, wherein the radius of gyration of the water-soluble polymer in aqueous solution is at least one-third of the average low permeability pore throat radius, and optionally wherein the radius of gyration of the water-soluble polymer in aqueous solution is at least one-half of the average low permeability pore throat radius.

B7. The method of paragraph B6, wherein the radius of gyration of the water-soluble polymer in aqueous solution is greater than the average low permeability pore throat radius.

B8. The method of any of paragraphs B3-B7, wherein the average molecular weight of the water-soluble polymer is greater than 10,000,000 Daltons.

B9. The method of any of paragraphs B-B8, wherein the pore throat blocking agent includes emulsified droplets.

B10. The method of paragraph B9, wherein the emulsified droplets are at least partially stabilized by a surfactant.

B11. The method of paragraph B9 or B10, wherein the emulsified droplets are at least partially stabilized by solid particles.

B12. The method of any of paragraphs B9-B11, wherein the average volume-weighted emulsified droplet radius is greater than one-third the average low permeability pore throat radius, and optionally wherein the average volume-weighted emulsified droplet radius is greater than one-half of the average low permeability pore throat radius.

B13. The method of paragraph B12, wherein the average volume-weighted emulsified droplet radius is greater than the average low permeability pore throat radius.

B14. The method of any of paragraphs B-B13, wherein the pore throat blocking agent is, or optionally includes sand grains and/or clay fines.

B15. The method of any of paragraphs B-B14, wherein the pore throat blocking agent includes at least one of a water-soluble polymer, emulsified droplets, sand grains, and clay fines.

B16. The method of any of paragraphs B-B15, wherein the pore throat blocking mixture comprises a dilute solution of the pore throat blocking agent in water.

B17. The method of paragraph B16, wherein the pore throat blocking agent comprises less than 5 wt % of the solution, optionally less than 3 wt % of the solution, and further optionally less than 1 wt % of the solution.

B18. The method of any of paragraphs B16-B17, wherein the viscosity of the solution is less than twice the viscosity of pure water at a shear rate of $1\ s^{-1}$ and reservoir temperature.

B19. The method of any of paragraph B-B18, wherein the pore throat blocking agent comprises less than 5 wt % of the mixture, optionally less than 3 wt % of the mixture, and further optionally less than 1 wt % of the mixture.

B20. The method of any of paragraphs B-B19, wherein the viscosity of the pore throat blocking mixture is less than twice the viscosity of pure water at a shear rate of $1\ s^{-1}$ and reservoir temperature.

B21. The method of any of paragraphs B-B20, wherein injecting the pore throat blocking mixture includes alternating injecting water, gas, and/or another injected fluid that is free of, at least substantially free of, or does not include the pore throat blocking mixture, and injecting the pore throat blocking mixture.

B22. The method of any of paragraphs B-B21, wherein the macroscopic fluid flow barrier is at least 1 acre in area, optionally at least 5 acres in area, optionally at least 10 acres in area, and further optionally at least 20 acres in area.

B23. The method of any of paragraphs B-B22, wherein at least a portion of the high permeability region well includes a high permeability well section within the high permeability region, optionally wherein the high permeability well section is oriented within 15 degrees of horizontal, and further optionally wherein the high permeability well section is horizontally oriented.

B24. The method of any of paragraphs B-B23, wherein at least a portion of the low permeability region well includes a low permeability well section within the low permeability region, optionally wherein the low permeability well section is oriented within 15 degrees of horizontal, and further optionally wherein the low permeability well section is horizontally oriented.

B25. The method of paragraph B24, wherein a horizontal portion of the high permeability region well section and a horizontal portion of the low permeability region well section are separated by a distance of less than 30 meters, and optionally by a distance of less than 30 meters when the distance is projected onto a horizontal plane.

B26. The method of paragraph B25, wherein the distance is less than 50 feet, and optionally less than 10 feet.

B27. The method of paragraph B25 or B26, wherein the horizontal portion of the high permeability region well section and the horizontal portion of the low permeability region well section are disposed in a substantially vertical plane.

B28. The method of any of paragraphs B-B27, wherein the high permeability region well has a high permeability region well completion depth, the low permeability region well has a low permeability region well completion depth, and further wherein the high permeability region well completion depth is less than the low permeability region well completion depth.

B29. The method of any of paragraphs B-B28, wherein the high permeability region well has a high permeability region well completion depth, the low permeability region well has a low permeability region well completion depth, and further wherein the high permeability region well completion depth is greater than the low permeability completion well depth.

B30. The method of any of paragraphs B-B29 wherein, subsequent to forming the macroscopic fluid flow barrier, the method further includes injecting water, gas, and/or another injected fluid that is free of, at least substantially free of, or does not include the pore throat blocking mixture into the first low permeability region, and producing reservoir fluids from and/or through the low permeability layer.

B31. The method of any of paragraphs B-B30, wherein, subsequent to forming the macroscopic fluid flow barrier, the method further includes drilling at least a first additional low permeability region well into the first low permeability region, and optionally still further includes at least one of producing reservoir fluids from and/or through and supplying injectant to and/or through the at least a first additional low permeability region well.

B32. The method of any of paragraphs B-B31, wherein, subsequent to forming the macroscopic fluid flow barrier, the method further includes injecting water, gas, and/or another injected fluid into the high permeability layer, and optionally still further includes producing reservoir fluids from and/or through the high permeability layer.

B33. The method of any of paragraphs B-B32, wherein, subsequent to forming the macroscopic fluid flow barrier, the method further includes drilling at least a first additional high permeability region well into the high permeability layer, and optionally still further includes at least one of producing reservoir fluids from and/or through and supplying injectant to and/or through the at least a first additional high permeability region well.

B34. The method of any of paragraphs B-B33, wherein the macroscopic fluid flow barrier decreases a fluid flow rate across the interface by at least 50%, and optionally by at least 75%, and further optionally by at least 95%.

B35. The method of any of paragraphs B-B34, wherein the method includes occluding at least 75% of the low permeability pores at the interface, and optionally at least 95% of the low permeability pores at the interface.

B36. The method of any of paragraphs B-B35, wherein the average high permeability pore throat radius is at least 10 times larger than the average low permeability pore throat radius, and optionally at least 25 times larger than the average low permeability pore throat radius, and further optionally at least 50 times larger than the average low permeability pore throat radius.

B37. The method of any of paragraphs B-B36, wherein the subterranean region includes a subterranean oil reservoir that comprises a plurality of at least substantially vertically-stacked regions that include at least a first high permeability region in fluid communication with at least a first low permeability region.

B38. The method of any of paragraphs B-B37, wherein producing reservoir fluids includes producing oil from the subterranean reservoir.

B39. The method of any of paragraphs B-B38, wherein the pore throat blocking agent includes a plurality of pore throat blocking agents.

B40. The use of any of the methods of paragraphs B-B39 to produce oil.

B41. The use of any of the methods of paragraphs B-B39 with any of the systems described herein.

B42. The production of oil by any of the methods of paragraphs B-B39.

B43. Oil produced by any of the methods of paragraphs A-A39.

C. A method of improving the recovery of oil from a subterranean reservoir that includes a high permeability region in fluid communication with a low permeability region, wherein the high permeability region includes a plurality of high permeability pores with an average high permeability pore throat radius, the low permeability region includes a plurality of low permeability pores with an average low permeability pore throat radius, and the average high permeability pore throat radius is larger than the average low permeability pore throat radius, the method comprising:
  step for forming a macroscopic fluid flow barrier of at least one acre (0.41 hectare) in area at an interface between the high permeability region and the low permeability region;
  supplying a stimulant fluid into at least one of the high permeability region and the low permeability region; and
  producing reservoir fluids from at least one of the high permeability region and the low permeability region.

C1. The method of paragraph C, wherein the step for forming includes any of the methods and/or subject matter of paragraphs A-A41.

C2. The method of paragraph C, wherein the step for forming includes any of the methods and/or subject matter of paragraphs B-B39.

C3. The method of any of paragraphs C-C2, wherein the low permeability region includes a low permeability region well, and the producing includes producing reservoir fluids from the low permeability region well.

C4. The method of any of paragraphs C-C3, wherein the macroscopic fluid flow barrier is at least 5 acres (2.0 hectares) in area, optionally at least 10 acres (4.1 hectares) in area, and further optionally at least 20 acres (8.1 hectares) in area.

C5. The method of any of paragraphs C-C4, wherein, subsequent to forming the macroscopic fluid flow barrier, the method further includes injecting water into the low permeability region and producing reservoir fluids from the low permeability layer.

C6. The method of any of paragraphs C-C5, wherein, subsequent to forming the macroscopic fluid flow barrier, the method further includes drilling at least a first additional low permeability region well into the low permeability region, and optionally still further includes at least one of producing reservoir fluids from and/or through and supplying the stimulant fluid to and/or through the at least a first additional low permeability region well.

C7. The method of any of paragraphs C-C6, wherein, subsequent to forming the macroscopic fluid flow barrier, the method further includes injecting the stimulant fluid into the high permeability region and producing reservoir fluids from the high permeability layer.

C8. The method of any of paragraphs C-C7, wherein, subsequent to forming the macroscopic fluid flow barrier, the method further includes drilling at least a first additional high permeability region well into the high permeability layer, and optionally still further includes at least one of producing reservoir fluids from and/or through and supplying the stimulant fluid to and/or through the at least a first additional high permeability region well.

C9. The method of any of paragraphs C-C8, wherein the subterranean reservoir includes a subterranean oil reservoir that comprises a plurality of at least substantially vertically-stacked regions that include at least a first high permeability region in fluid communication with at least a first low permeability region.

C10. The method of paragraph C9, the method further including producing oil from the subterranean reservoir.

C11. The method of any of paragraphs C-C10, wherein the stimulant fluid includes water.

C12. The method of any of paragraphs C-C11, wherein the stimulant fluid includes steam.

C13. The use of any of methods C-C12 to produce oil.

C14. The use of any of methods C-C13 with any of the systems described herein.

C15. The production of oil by any of the methods of paragraphs C-C12.

C16. Oil produced by any of the methods of paragraphs C-C12.

D. A method of recovery of oil from a subterranean reservoir composed of vertically stacked layers comprising at least one high permeability layer in flow connection with at least one low permeability layer, the method comprising:
  injecting into the at least one high permeability layer a water-continuous fluid comprising one or more pore throat blocking agents, wherein the pore throat blocking agent is physically sized to substantially block flow through at least one low permeability layer while substantially not blocking flow through at least one high permeability layer;
  continuing injection until a barrier to flow is substantially formed at an interface between at least one high permeability layer and at least one low permeability layer, wherein the barrier extends over an area of at least one acre; and
  producing oil from at least one well completed in at least one low permeability layer.

D1. The method of paragraph D, wherein the permeability of the high permeability layer is at least 10 times larger than the permeability of the low permeability layer, and optionally wherein the permeability of the high permeability layer is at least 50 times larger than the permeability of the low permeability layer.

D2. The method of any of paragraphs D-D1, wherein the pore throat blocking agent comprises a water-soluble polymer.

D3. The method of paragraph D2, wherein the radius of gyration of the water-soluble polymer in aqueous solution is greater than one-third a mean pore throat radius of the low permeability layer.

D4. The method of paragraph D3, wherein the radius of gyration of the water-soluble polymer in aqueous solution is greater than a mean pore throat radius of the low permeability layer.

D5. The method of any of paragraphs D2-D4, wherein the water-soluble polymer has a molecular weight of at least 10,000,000 Daltons.

D6. The method of any of paragraphs D-D5, wherein the pore throat blocking agent comprises emulsion droplets.

D7. The method of paragraph D6, wherein the emulsion droplets are at least partially stabilized by a surfactant.

D8. The method of paragraph D6 or D7, wherein the emulsion droplets are at least partially stabilized by solid particles.

D9. The method of any of paragraphs D6-D8, wherein the average volume-weighted droplet radius is larger than one-third a mean pore throat radius of the low permeability layer.

D10. The method of paragraph D9, wherein the average volume-weighted droplet radius is larger than the mean pore throat radius of the low permeability layer.

D11. The method of any of paragraphs D-D10, wherein the pore throat blocking agent comprises, and optionally is, sand grains and/or clay fines.

D12. The method of any of paragraphs D-D11, wherein the pore throat blocking agent comprises at least one of a water-soluble polymer, stable emulsion droplets, sand grains, and clay fines.

D13. The method of any of paragraphs D-D12, wherein the water-continuous fluid includes a dilute solution of the one or more pore throat blocking agents in water.

D14. The method of paragraph D13, wherein the viscosity of the water-continuous fluid is less than twice the viscosity of pure water at a shear rate of $1\ s^{-1}$ and reservoir temperature.

D15. The method of paragraph D13, wherein the dilute solution includes less than 1% by mass of the pore throat blocking agents.

D16. The method of any of paragraphs D-D15, wherein the water-continuous fluid is injected alternately with water, gas, and/or another injected fluid that does not include the pore throat blocking agents.

D17. The method of any of paragraphs D-D16, wherein the barrier extends over an area of at least 10 acres, and optionally an area of at least 20 acres.

D18. The method of any of paragraphs D-D17, wherein the injecting includes injecting into a substantially horizontal injection well.

D19. The method of any of paragraphs D-D18, wherein, subsequent to forming the barrier to flow, the method further includes injecting water, gas, and/or another injected fluid into the low permeability layer and producing oil from and/or through the low permeability layer.

D20. The method of paragraph D19, the method further including drilling at least a first additional injection well into the low permeability layer, and optionally still further includes injecting water into the at least a first additional injection well.

D21. The method of any of paragraphs D-D20, wherein injecting the water-continuous fluid and producing oil include injecting the water-continuous fluid and injecting oil using wells that are completed in the same general area but that are vertically offset from one another.

D22. The method of paragraph D21, wherein at least one of the wells, and optionally all of the wells, are horizontal wells and/or include horizontal well completion sections.

D23. The use of any of methods D-D22 to produce oil.

D24. The use of any of methods D-D23 with any of the systems described herein.

D25. The production of oil by any of the methods of paragraphs D-D22.

D26. Oil produced by any of the methods of paragraphs D-D22.

E. A hydrocarbon production system, comprising:
a subsurface formation containing a subterranean reservoir having a high permeability region and a low permeability region in fluid communication with the high permeability region and separated from the high permeability region by an interface, wherein the high permeability region includes a plurality of high permeability pores with an average high permeability pore throat radius, wherein the low permeability region includes a plurality of low permeability pores with an average low permeability pore throat radius, and further wherein the average high permeability pore throat radius is larger than the average low permeability pore throat radius;
a macroscopic fluid flow barrier extending between the high permeability region and the low permeability region, wherein the macroscopic fluid flow barrier includes a pore throat blocking agent that occludes at least 50% of the low permeability pores at the interface, and optionally at least 75% of the low permeability pores at the interface, and further optionally at least 95% of the of the low permeability pores at the interface; and
at least one high permeability region well extending into, and optionally completed within, the high permeability region of the subterranean reservoir; and
at least one low permeability region well extending into, and optionally completed within, the low permeability region of the subterranean reservoir.

E1. The system of paragraph E, wherein the barrier is at least 1 acre (0.4 hectare) in area, optionally at least 5 acres (2.0 hectares) in area, optionally at least 10 acres (4.0 hectares) in area, and further optionally at least 20 acres (8.1 hectares) in area.

E2. The system of any of paragraphs E-E1, wherein the macroscopic fluid flow barrier decreases a fluid flow rate across the interface by at least 50%, and optionally by at least 75%, and further optionally by at least 95%.

E3. The system of any of paragraphs E-E2, wherein the average high permeability pore throat radius is at least 10 times larger than the average low permeability pore throat radius, and optionally at least 25 times larger than the average low permeability pore throat radius, and further optionally at least 50 times larger than the average low permeability pore throat radius.

E4. The system of any of paragraphs E-E3, wherein the high permeability region and the low permeability region are vertically, or at least substantially vertically, stacked regions of the subterranean reservoir.

E5. The system of any of paragraphs E-E4, wherein at least a portion of the high permeability region well includes a horizontal well section, and optionally a horizontal well completion section.

E6. The system of any of paragraphs E-E5, wherein at least a portion of the low permeability region well includes a horizontal well section, and optionally a horizontal well completion section.

E7. The system of paragraph E6, wherein a horizontal portion of the high permeability region well and a horizontal portion of the low permeability region well are separated by a distance of less than 30 meters, and optionally by a distance of less than 30 meters when the distance is projected onto a horizontal plane.

E8. The system of paragraph E7, wherein the distance is less than 15 meters, and optionally less than 3 meters.

E9. The system of paragraph E6 or E7, wherein the horizontal portion of the high permeability region well and the horizontal portion of the low permeability region well are disposed in an at least substantially vertical plane.

E10. The system of any of paragraphs E-E9, wherein the high permeability region well has a high permeability region well completion depth, the low permeability region well has a low permeability region well completion depth, and further wherein the high permeability region well completion depth is less than the low permeability region well completion depth.

E11. The system of any of paragraphs E-E10, wherein the high permeability region well has a high permeability region well completion depth, the low permeability region well has a low permeability region well completion depth, and further wherein the high permeability region well completion depth is greater than the low permeability region well completion depth.

E12. The system of any of paragraphs E-E11, wherein the subterranean reservoir includes a plurality of high permeability regions that are separated by a plurality of low permeability regions, and further wherein the system further includes a plurality of macroscopic flow barriers separating respective ones of the plurality of high permeability regions and the plurality of low permeability regions.

E13. The system of any of paragraphs E-E12, wherein the pore throat blocking agent includes a water-soluble polymer.

E14. The system of paragraph E13, wherein the radius of gyration of the water-soluble polymer in aqueous solution is at least one-third of the average low permeability pore throat radius, and optionally wherein the radius of gyration of the water-soluble polymer in aqueous solution in at least one-half of the average low permeability pore throat radius.

E15. The system of paragraph E14, wherein the radius of gyration of the water-soluble polymer in aqueous solution is greater than the average low permeability pore throat radius.

E16. The system of any of paragraphs E13-E15, wherein the average molecular weight of the water-soluble polymer is greater than 10,000,000 Daltons.

E17. The system of any of paragraphs E-E16, wherein the pore throat blocking agent includes emulsified droplets.

E18. The system of paragraph E17, wherein the emulsified droplets are at least partially stabilized by a surfactant.

E19. The system of paragraph E17 or E18, wherein the emulsified droplets are at least partially stabilized by solid particles.

E20. The system of any of paragraphs E17-E19, wherein the average volume-weighted emulsified droplet radius is greater than one-third the average low permeability pore throat radius, and optionally wherein the average volume-weighted emulsified droplet radius is greater than one-half of the average low permeability pore throat radius.

E21. The system of paragraph E20, wherein the average volume-weighted emulsified droplet radius is greater than the average low permeability pore throat radius.

E22. The system of any of paragraphs E-E21, wherein the pore throat blocking agent is, or optionally includes sand grains and/or clay fines.

E23. The system of any of paragraphs E-E22, wherein the pore throat blocking agent includes at least one of a water-soluble polymer, emulsified droplets, sand grains, and clay fines.

E24. The system of any of paragraphs E-E23, wherein the pore throat blocking agent includes a plurality of pore throat blocking agents.

E25. The formation of the macroscopic barrier of the systems of any of paragraphs E-E24 by any of the methods of paragraphs A-A41, B-B39, or C-C12.

E26. The use of the system of any of paragraphs E-E24 to produce oil from the subterranean reservoir.

E27. The use of the system of any of paragraphs E-E24 to produce oil from the low permeability region of the subterranean reservoir.

E28. Oil produced from the systems of any of paragraphs E-E24.

INDUSTRIAL APPLICABILITY

The systems and methods for the formation of hydraulic barriers are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of forming a barrier between a high permeability subterranean region and a low permeability subterranean region, wherein the high permeability subterranean region is in fluid communication with the low permeability subterranean region, the high permeability subterranean region includes a plurality of high permeability pores with an average high permeability pore throat radius, the low permeability subterranean region includes a plurality of low permeability pores with an average low permeability pore throat radius, and the average high permeability pore throat radius is larger than the average low permeability pore throat radius, the method comprising:

providing a pore throat blocking mixture that comprises water and a pore throat blocking agent, wherein the pore throat blocking mixture has a viscosity and the pore throat blocking agent is configured to pass through the average high permeability pore throat radius but to occlude the average low permeability pore throat radius;

supplying the pore throat blocking mixture to the high permeability subterranean region;

flowing at least a portion of the water of the pore throat blocking mixture through an interface between the high permeability subterranean region and the low permeability subterranean region; and occluding the plurality of low permeability pores with the pore throat blocking agent at the interface to form a macroscopic fluid flow barrier.

2. The method of claim 1, wherein the high permeability subterranean region includes a high permeability region well completed in the high permeability subterranean region, and wherein the supplying further includes injecting the pore throat blocking mixture into the high permeability region well.

3. The method of claim 1, wherein the low permeability subterranean region includes a low permeability region well completed in the low permeability subterranean region, and wherein the method further comprises producing reservoir fluids through the low permeability region well.

4. The method of claim 1, wherein the pore throat blocking agent includes a water-soluble polymer.

5. The method of claim 4, wherein a radius of gyration of the water-soluble polymer in aqueous solution is at least one-third the average low permeability pore throat radius.

6. The method of claim 5, wherein the radius of gyration of the water-soluble polymer in aqueous solution is greater than the average low permeability pore throat radius.

7. The method of claim 4, wherein an average molecular weight of the water-soluble polymer is greater than 10,000,000 Daltons.

8. The method of claim 1, wherein the pore throat blocking agent includes emulsified droplets.

9. The method of claim 8, wherein the emulsified droplets are at least partially stabilized by a surfactant.

10. The method of claim 8, wherein the emulsified droplets are at least partially stabilized by solid particles.

11. The method of claim 8, wherein an average volume-weighted emulsified droplet radius is greater than one-third the average low permeability pore throat radius.

12. The method of claim 11, wherein the average volume-weighted emulsified droplet radius is greater than the average low permeability pore throat radius.

13. The method of claim 1, wherein the pore throat blocking agent includes at least one of a water-soluble polymer, emulsified droplets, sand grains, and clay fines.

14. The method of claim 1, wherein the pore throat blocking mixture comprises a dilute mixture of the pore throat blocking agent in water.

15. The method of claim 14, wherein the pore throat blocking agent comprises less than one weight percent of the mixture.

16. The method of claim 14, wherein the viscosity of the pore throat blocking mixture at a shear rate of $1\ s^{-1}$ and reservoir temperature is less than twice a viscosity of pure water at reservoir temperature.

17. The method of claim 1, further comprising injecting a solution that includes alternating injecting water that is substantially absent of the pore throat blocking agent and injecting the pore throat blocking mixture.

18. The method of claim 1, further comprising injecting a solution that includes alternating injecting gas that is substantially absent of the pore throat blocking agent and injecting the pore throat blocking mixture.

19. The method of claim 1, wherein a macroscopic fluid flow barrier is at least one acre (0.4 hectare) in area.

20. The method of claim 19, wherein the macroscopic fluid flow barrier is at least 20 acres (8.1 hectares) in area.

21. The method of claim 1, wherein at least a portion of the high permeability region well includes a well section within the high permeability region orientated within 15 degrees of horizontal.

22. The method of claim 21, wherein at least a portion of the low permeability region well includes a well section within the low permeability region orientated within 15 degrees of horizontal.

23. The method of claim 1, wherein subsequent to forming the barrier, the method further comprises injecting water into the low permeability subterranean region and producing reservoir fluids from the low permeability subterranean region.

24. The method of claim 23, wherein subsequent to forming the barrier, the method further includes drilling at least one additional well into the low permeability subterranean region.

25. The method of claim 1, wherein a subterranean region includes a subterranean oil reservoir that comprises a plurality of vertically-stacked regions that include at least a first high permeability region in fluid communication with at least a first low permeability region.

26. The method of claim 25, the method further including producing oil from the subterranean region.

27. The method of claim 1, further comprising forming the macroscopic fluid flow barrier at the interface, wherein a thickness of the macroscopic fluid flow barrier is controlled by how rapidly permeability spatially changes.

28. A method for recovering oil from a subterranean reservoir that comprises a plurality of at least substantially vertically-stacked regions that include at least a first high permeability region in fluid communication with at least a first low permeability region, wherein the high permeability region includes a plurality of high permeability pores with an average high permeability pore throat radius, the low permeability region includes a plurality of low permeability pores with an average low permeability pore throat radius, wherein the average high permeability pore throat radius is larger than the average low permeability pore throat radius, and further wherein the at least the first high permeability region includes at least a first high permeability region well and the at least the first low permeability region includes at least a first low permeability region well, the method comprising:
  providing a pore throat blocking mixture that comprises water and a pore throat blocking agent, wherein the pore throat blocking agent is configured to pass through the average high permeability pore throat radius but occlude the average low permeability pore throat radius;
  supplying the pore throat blocking mixture into the at least the first high permeability region well;
  producing reservoir fluids from the at least the first low permeability region well; and
  continuing supplying and producing until a macroscopic fluid flow barrier of at least one acre in area is formed by the pore throat blocking agent at an interface between the high permeability region and the low permeability region.

29. A method of improving the recovery of oil from a subterranean reservoir that includes a high permeability region in fluid communication with a low permeability region, wherein the high permeability region includes a plurality of high permeability pores with an average high permeability pore throat radius, the low permeability region includes a plurality of low permeability pores with an average low permeability pore throat radius, and the average high permeability pore throat radius is larger than the average low permeability pore throat radius, the method comprising:
  forming a macroscopic fluid flow barrier of at least one acre in area at an interface between the high permeability region and the low permeability region by occluding the low permeability region with a pore throat blocking agent;
  supplying a stimulant fluid into at least one of the high permeability region and the low permeability region; and
  producing reservoir fluids from at least one of the high permeability region and the low permeability region.

30. The method of claim 28, further comprising forming the macroscopic fluid flow barrier at the interface, wherein a thickness of the macroscopic fluid flow barrier is controlled by how rapidly permeability spatially changes.

31. The method of claim 29, wherein a thickness of the macroscopic fluid flow barrier is controlled by how rapidly permeability spatially changes.

* * * * *